United States Patent
Zheng

(10) Patent No.: US 11,307,761 B2
(45) Date of Patent: Apr. 19, 2022

(54) TEXT EDITING METHOD AND MOBILE TERMINAL

(71) Applicant: VIVO MOBILE COMMUNICATION CO., LTD., Chang'an Dongguan (CN)

(72) Inventor: Weiwei Zheng, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/765,682

(22) PCT Filed: Nov. 14, 2018

(86) PCT No.: PCT/CN2018/115389
§ 371 (c)(1),
(2) Date: May 20, 2020

(87) PCT Pub. No.: WO2019/096154
PCT Pub. Date: May 23, 2019

(65) Prior Publication Data
US 2020/0301574 A1    Sep. 24, 2020

(30) Foreign Application Priority Data
Nov. 20, 2017   (CN) .......................... 201711169660.2

(51) Int. Cl.
*G06F 3/0481*   (2013.01)
*G06F 3/04883*  (2022.01)
*G06F 40/166*   (2020.01)

(52) U.S. Cl.
CPC ........ *G06F 3/04883* (2013.01); *G06F 3/0481* (2013.01); *G06F 40/166* (2020.01)

(58) Field of Classification Search
CPC ..... G06F 40/166; G06F 3/0481; G06F 3/0488
See application file for complete search history.

(56) References Cited

U.S. PATENT DOCUMENTS 5,604,853 A * 2/1997 Nagashima ........... G06F 40/166
                                                715/210
6,240,430 B1   5/2001 Deike et al.
(Continued)

FOREIGN PATENT DOCUMENTS

CN    101651895 A   2/2010
CN    101924727 A   12/2010
(Continued)

OTHER PUBLICATIONS

International Search Report & Written Opinion related to Application No. PCT/CN2018/115389; dated Jun. 4, 2020.
(Continued)

*Primary Examiner* — Phenuel S Salomon
(74) *Attorney, Agent, or Firm* — von Briesen & Roper, s.c.

(57) ABSTRACT

The preset disclosure provides a text editing method and a mobile terminal. The method includes: detecting a touch operation of a user on at least one text block displayed in an operating region of a preset text recycling window; and if a preset first touch operation is detected, pasting at least one character selected by the first touch operation to the current position of the cursor in a text editing region; wherein at least one text block to be recycled is stored in the text recycling window.

18 Claims, 22 Drawing Sheets

(56) References Cited

U.S. PATENT DOCUMENTS

| | | | |
|---|---|---|---|
| 7,921,082 B2* | 4/2011 | Mukker | G06F 16/10 707/674 |
| 2005/0165863 A1* | 7/2005 | Mukker | G06F 16/10 |
| 2006/0095470 A1* | 5/2006 | Cochran | G06F 16/10 |
| 2007/0022386 A1 | 1/2007 | Boss et al. | |
| 2007/0120832 A1 | 5/2007 | Saarinen et al. | |
| 2007/0244867 A1* | 10/2007 | Malandain | G06F 16/313 |
| 2011/0197155 A1* | 8/2011 | Lee | G06F 1/1616 715/770 |
| 2012/0304094 A1* | 11/2012 | Cho | G06F 3/04842 715/770 |
| 2013/0014054 A1* | 1/2013 | Choi | G06F 40/103 715/810 |
| 2013/0166819 A1* | 6/2013 | Yerushalmi | G06F 3/0625 711/103 |
| 2013/0191769 A1* | 7/2013 | Park | G06F 9/543 715/770 |
| 2013/0239034 A1* | 9/2013 | Ota | G06F 16/9577 715/765 |
| 2013/0262395 A1* | 10/2013 | Levinshtein | G06F 16/162 707/674 |
| 2013/0326371 A1* | 12/2013 | Xu | H04L 67/2842 715/753 |
| 2014/0306978 A1* | 10/2014 | Du | G06F 9/451 345/581 |
| 2015/0019997 A1* | 1/2015 | Kim | G06F 3/04886 715/752 |
| 2015/0026620 A1* | 1/2015 | Kwon | G06F 3/04883 715/770 |
| 2015/0169519 A1* | 6/2015 | Zhou | G06F 40/166 715/256 |
| 2016/0154686 A1* | 6/2016 | Huang | G06F 3/0488 715/770 |
| 2016/0197671 A1 | 7/2016 | Hwang et al. | |
| 2017/0181165 A1 | 6/2017 | Au et al. | |
| 2017/0277425 A1* | 9/2017 | Shinomiya | G06F 3/0482 |
| 2020/0183885 A1* | 6/2020 | Li | H04M 1/2477 |

FOREIGN PATENT DOCUMENTS

| | | |
|---|---|---|
| CN | 102141886 A | 8/2011 |
| CN | 102981750 A | 3/2013 |
| CN | 103312462 A | 9/2013 |
| CN | 103761216 A | 4/2014 |
| CN | 104156140 A | 11/2014 |
| CN | 104320539 A | 1/2015 |
| CN | 104834433 A | 8/2015 |
| CN | 106648371 A | 5/2017 |
| CN | 106919307 A | 7/2017 |
| CN | 107748741 A | 3/2018 |
| EP | 2527984 A1 | 11/2012 |
| EP | 2544098 A2 | 1/2013 |
| JP | 2004030268 A | 1/2004 |
| WO | 2016148530 A1 | 9/2016 |

OTHER PUBLICATIONS

Chinese Office Action for related Chinese Application No. 201711169660.2; dated Jul. 18, 2019.

Extended European Search Report for related Application No. 18879312.9; dated Oct. 22, 2020.

Anonymous: "Copy and paste multiple items by using the Office Clipboad", Web Archive Webpage, Jun. 17, 2010 (Jun. 17, 2010), pp. 1-10, XPO55O61449, Retrieved from the Internet: URL: http://web.archive.org/web/201000617180306/http://office.microsoft.com/en-us/publisher-help/copy-and-paste-multiple-items-by-using-the-office-clipboard-HA010163602.aspx; retrieved on Apr. 30, 2013, *the whole document*.

International Search Report & Written Opinion related to Application No. PCT/CN2018/104989; dated Jun. 4, 2020.

Chinese Office Action for related Chinese Application No. 201711175871.7; dated Apr. 21, 2020.

Chinese Search Report for related Application No. 201711169660.2; dated Nov. 16, 2018.

LG Electronics, "Discussion on frame structure for NR", Apr. 11-15, 2016, 3GPP TSG RAN WG1 Meeting #84bis, Busan, South Korea.

CMCC, "Discussion on backhaul signaling exhange for NR frame structure", Nov. 27-Dec. 1, 2017, 3GPP TSG-RAN WG3 #98, Reno, US.

* cited by examiner

TEXT EDITING METHOD AND MOBILE TERMINAL

CROSS-REFERENCE TO RELATED APPLICATION

This application is the U.S. national phase of PCT Application No. PCT/CN2018/115389 filed on Nov. 14, 2018, which claims priority to Chinese Patent Application No. 201711169660.2 filed on Nov. 20, 2017, the disclosures of which are incorporated in their entirety by reference herein.

TECHNICAL FIELD

The present disclosure relates to the field of communication technology, and in particular to a text editing method and a mobile terminal.

BACKGROUND

As mobile terminals have more and more functions, mobile terminals are widely used in various scenarios in daily life. For example, users can use mobile terminals to chat in social software, to edit character information in office software, and so on. In the related art, if errors such as typos, superfluous characters, missing characters, unsmooth sentences and the like are found in the characters inputted in the mobile terminal, the characters can be deleted from the end of the text until the cursor moves to the location where the error occurred, the wrong character is modified, and the tail text is re-entered. In this way, the user needs to enter characters one by one after deleting the words, and there are many steps to re-enter the tail text. It can be seen that the related art has the problem of complicated operations of character deletion, insertion and modification in the character editing process.

SUMMARY

In a first aspect, an embodiment of the present disclosure provides a text editing method which includes:
detecting a touch operation of a user on at least one text block displayed in an operating region of a preset text recycling window; and
if a preset first touch operation is detected, pasting at least one character selected by the first touch operation to a current position of a cursor in a text editing region;
wherein at least one text block to be recycled is stored in the text recycling window.

In a second aspect, an embodiment of the present disclosure further provides a mobile terminal which includes:
a first detection module configured to detect a touch operation of a user on at least one text block displayed in an operating region of a preset text recycling window; and
a pasting module configured to, if a preset first touch operation is detected, paste at least one character selected by the first touch operation to a current position of a cursor in a text editing region;
wherein at least one text block to be recycled is stored in the text recycling window.

In a third aspect, an embodiment of the present disclosure further provides a mobile terminal which includes a processor, a storage, and a computer program stored on the storage and capable of running on the processor, the computer program performing the steps of the above text editing method when running on the processor.

In a fourth aspect, an embodiment of the present disclosure further provides a computer readable storage medium having computer program stored thereon, the computer program performing, when executed by a processor, the steps of the above text editing method.

DETAILED DESCRIPTION

The technical solutions in the embodiments of the present disclosure will be described clearly and thoroughly in conjunction with the drawings in the embodiments of the present disclosure. Obviously, the described embodiments are part of the embodiments of the present disclosure, but not all of the embodiments. Based on the embodiments in the present disclosure, all other embodiments obtained by those of ordinary skill in the art without paying any creative work fall within the protection scope of the present disclosure.

Figure 1:
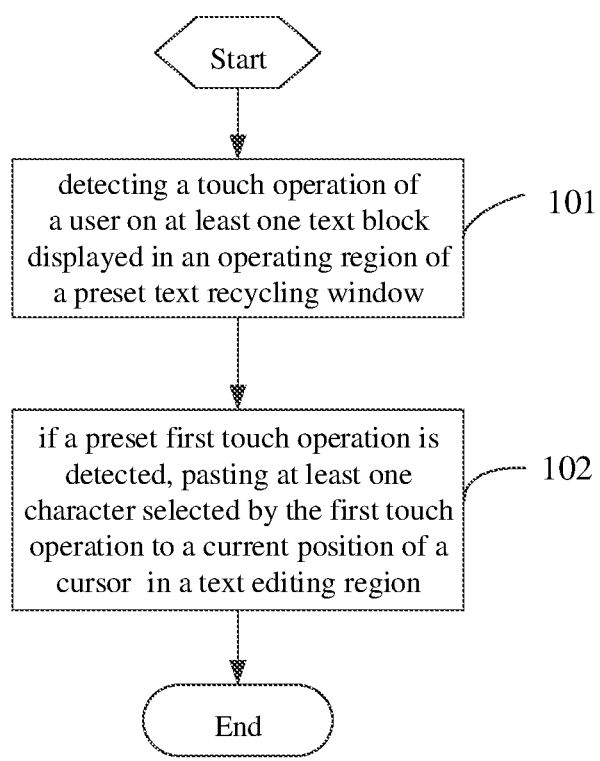
FIG. 1 is a first flow chart of a text editing method according to an embodiment of the present disclosure.

Referring to FIG. 1, it is a flow chart of a text editing method according to an embodiment of the present disclosure. The text editing method may be applied to a mobile terminal. As shown in FIG. 1, the method includes the following steps:

Step 101, detecting a touch operation of a user on at least one text block displayed in an operating region of a preset text recycling window.

Figure 2:
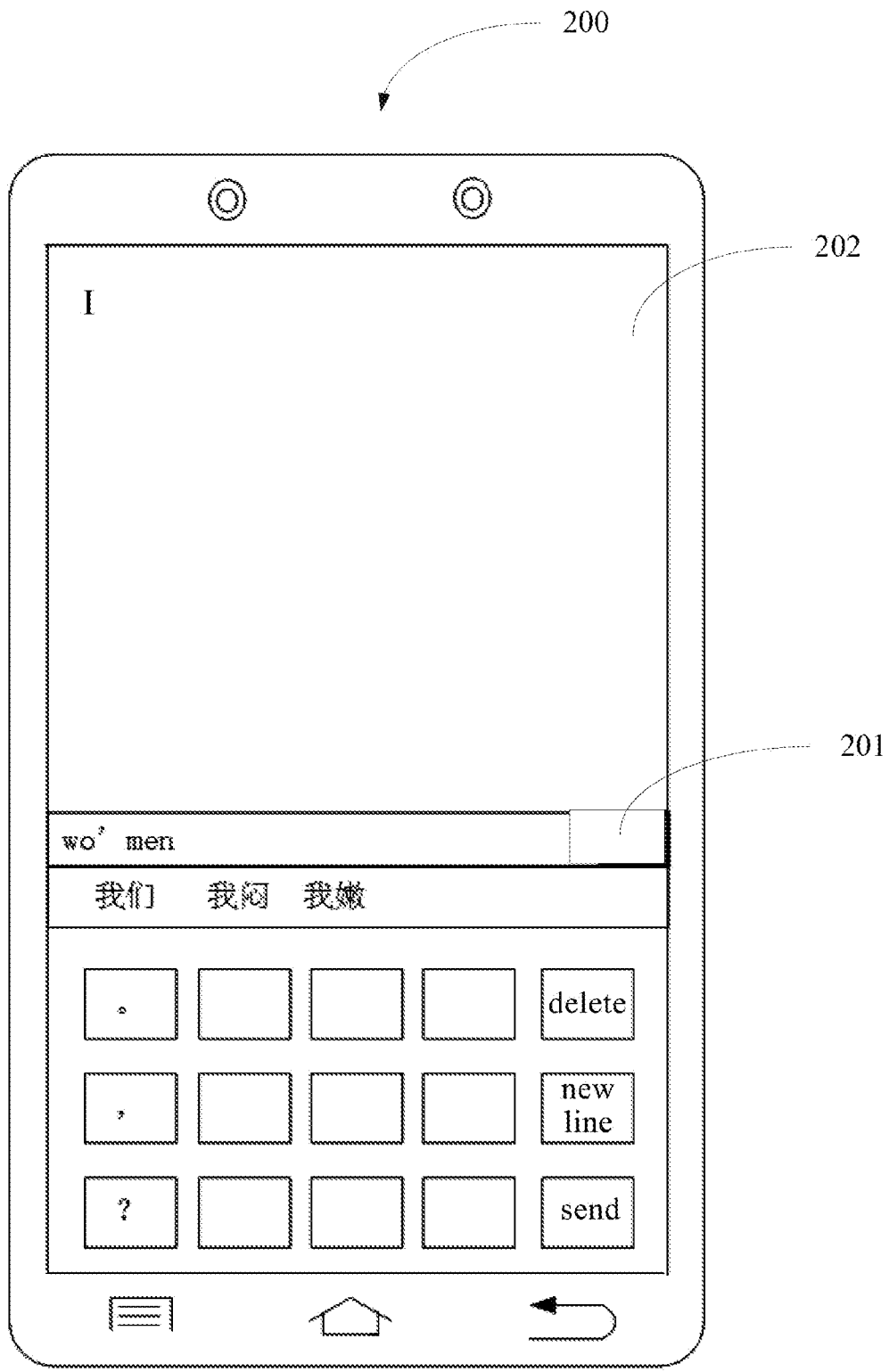
FIG. 2 is a first schematic diagram of a screen of a mobile terminal according to an embodiment of the present disclosure.

In this embodiment, at least one text block to be recycled is stored in the text recycling window. At least one character is included in the text block. The character includes a number, text, a punctuation mark, etc. The text block to be recycled stored in the text recycling window is a text block deleted by the user through a cut operation and/or a delete operation. The text information included in the text block deleted by the user has a high reuse value for the user. Thus, by storing the text block to be recycled in the text recycling window, the text block having a high reuse value can be provided for the user, and the probability that the user selects an appropriate character from the text block is increased. In the Step 101, the operating region may be displayed according to a touch operation received on the text recycling window displayed on the screen of a mobile terminal. Specifically, referring to FIG. 2, it is a first schematic diagram of the screen of a mobile terminal according to an embodiment of the present disclosure. A text recycling window 201 and a text editing region 202 are displayed on the screen of the mobile terminal 200 shown in FIG. 2. The screen of the mobile terminal shown in FIG. 2 is in a state that the operating region is not displayed. When the text recycling window 201 receives a preset touch operation, the operating region is displayed. It should be noted that, the character in the text block to be recycled may be one or more character removed correspondingly through a delete operation, a cut operation, etc. The character(s) may be edited on the text editing region 202. When the text recycling window 201 receives a preset touch operation, the operating region is displayed.

Figure 3:
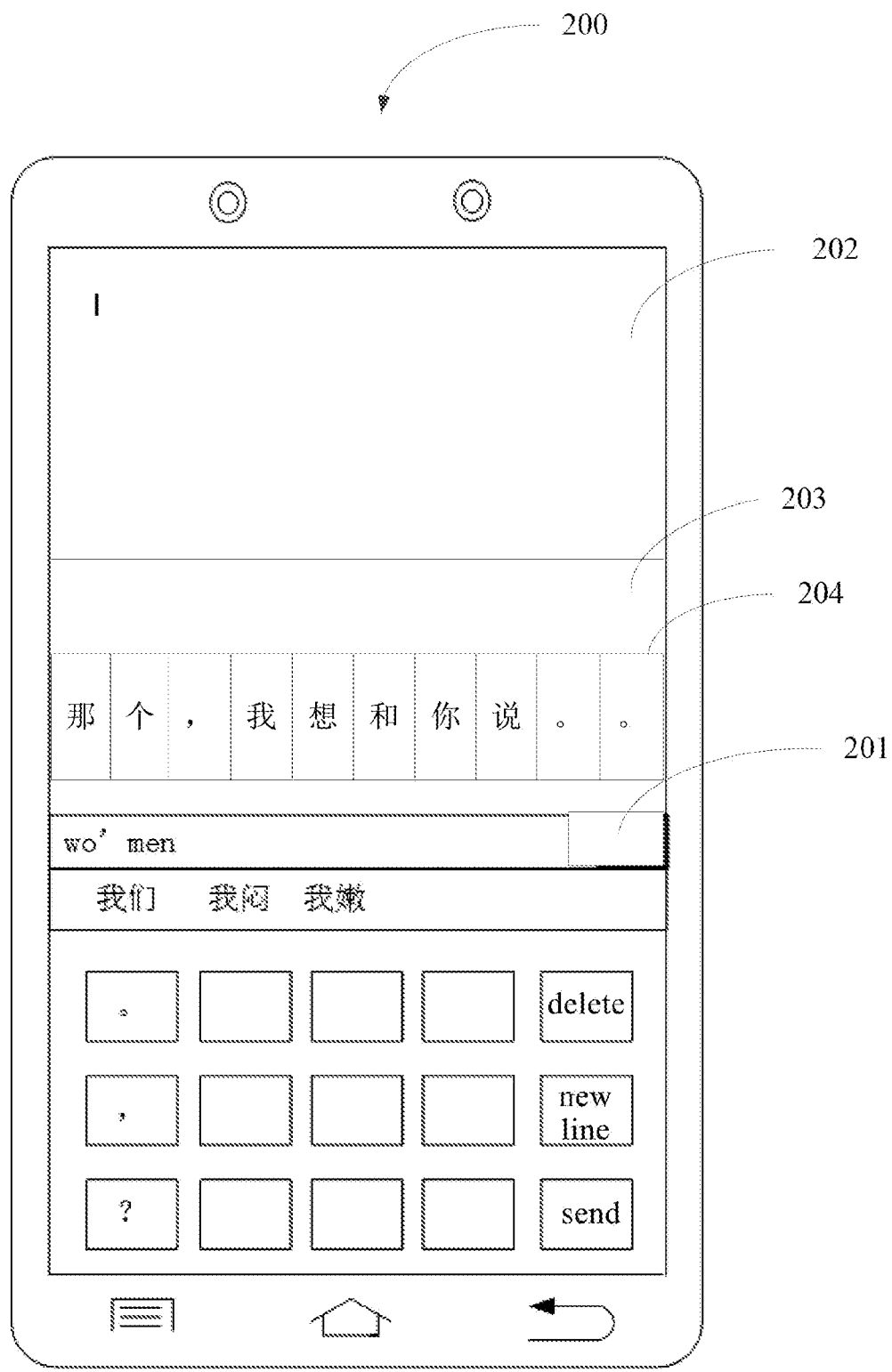
FIG. 3 is a second schematic diagram of a screen of a mobile terminal according to an embodiment of the present disclosure.

After the text recycling window 201 receives a preset touch operation, the operating region is displayed on the screen of the mobile terminal 200. Specifically, referring to FIG. 3, it is a second schematic diagram of the screen of a mobile terminal according to an embodiment of the present disclosure. FIG. 3 is a schematic diagram of the screen formed by displaying the operating region on the basis of FIG. 2. The text recycling window 201, the text editing region 202 and an operating region 203 are displayed on the screen of the mobile terminal 200 shown in FIG. 3. A text block 204 is further displayed on the operating region 203.

The specific text content of the text block 204 is "那个, 我想和你说。". Text editing may be performed in the text editing region 202.

Figure 4:
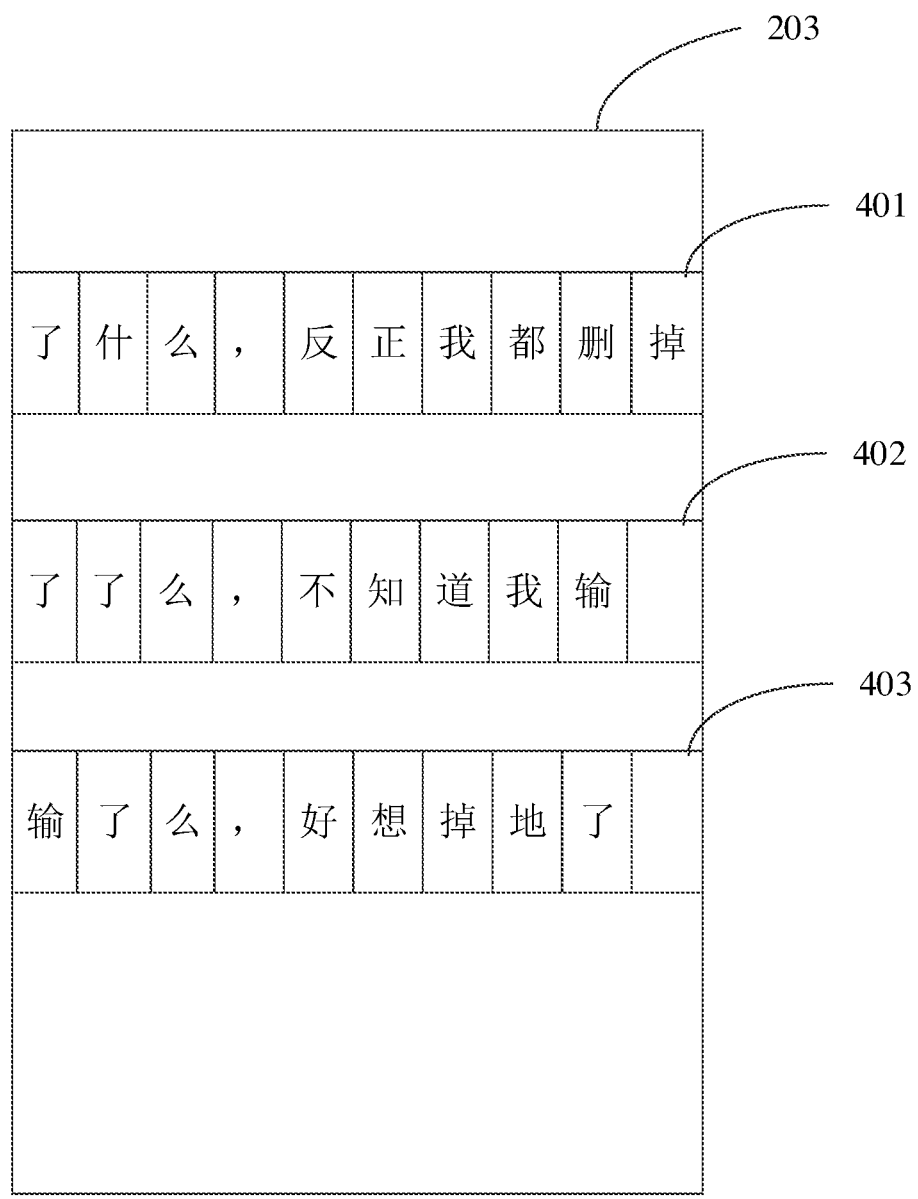
FIG. 4 is a first schematic diagram of an operating region according to an embodiment of the present disclosure.

In addition, although one text block 204 is displayed on the operating region 203 shown in FIG. 3, this is merely schematic, and at least two text blocks may also be displayed on the operating region 203. Specifically, referring to FIG. 4, it is a schematic diagram of the operating region according to an embodiment of the present disclosure. In FIG. 4, a first text block 401, a second text block 402 and a third text block 403 are displayed on the operating region 203. The first text block 401 includes a plurality of characters "了什么, 反正我都删掉", the second text block 402 includes multiple characters "了什么, 不知道我输", and the third text block 403 includes multiple characters "输了2, 好想摔地了". The creation time of the first text block 401 is the latest, the creation time of the third text block 403 is the earliest, and the creation time of the second text block 402 is between the creation time of the first text block 401 and the creation time of the third text block 403. According to the order of the creation times of the first text block 401, the second text block 402 and the third text block 403, the first text block 401, the second text block 402 and the third text block 403 are sequentially displayed on the operating region 203.

It should be also noted that, the number and arrangement order of the text blocks displayed in the operating region may be set by the user, or may be set by default, which is not limited here. It is also possible to preset a movement operation, and when the movement operation is received, adjust the position of the operating region according to the movement operation. For example, in Step 101, if the text block is the text block 204 shown in FIG. 3, a touch operation on the text block 204 is detected. If the text block includes the first text block 401, the second text block 402 and the third text block 403 on the operating region 203 shown in FIG. 3, a touch operation on at least one of the first text block 401, the second text block 402 and the third text block 403 is detected. In this embodiment, the touch operation includes a clicking operation and a sliding operation. The clicking operation includes a single-clicking operation, a double-clicking operation and a multi-clicking operation.

Step 102, if a preset first touch operation is detected, pasting at least one character selected by the first touch operation to a current position of a cursor in a text editing region.

In this embodiment, the preset first touch operation may be a clicking operation and a sliding operation. The clicking operation includes a single-clicking operation, a double-clicking operation and a multi-clicking operation. The second touch operation includes a sliding operation in a first preset sliding direction and/or a sliding operation with a first preset sliding trajectory, and a clicking operation detected in a first preset character display region. For example, the second touch operation may be a sliding operation with the sliding direction to the right, may be a sliding operation with a length of the sliding trajectory exceeding 1 cm, or may be a single-clicking operation, double-clicking operation or multi-clicking operation received in the character display region in the text block in the operating region.

The at least one character selected by the first touch operation may be at least one character selected from a same text block, or may be characters selected from multiple text blocks respectively. For example, the first touch operation may select at least one character from one of the first text block 401, the second text block 402 and the third text block 403 in the operating region 203 shown in FIG. 4. For example, the first touch operation selects two characters "什么" from the first text block 401; the first touch operation may also select at least one character from at least two of the first text block 401, the second text block 402 and the third text block 403 respectively. For example, the first touch operation select two characters "反正" from the first text block 401, select the character "我" from the second text block 402, and select two characters "好想" from the third text block 403.

Specifically, referring to FIG. 3, if the at least one character selected by the first touch operation is the two characters "我想" in the text block 204 shown in FIG. 3, the selected three characters "去食堂" are pasted to the current position of the cursor, and the two characters "我想" are displayed in the text editing region 202. Further, also referring to FIG. 4, if the first touch operation selects a character "都" from the first text block 401, three characters "不知道" from the second text block 402, and two characters "输了" from the third text block 403, the selected characters "都不知道输了" are pasted to the current position of the cursor in the text editing region.

In this way, characters selected from one text block or more than two text blocks can be conveniently pasted to the current position of the cursor, and the user does not need to enter characters one by one, which reduces the operation steps for the user to write characters and saves the user's time.

It should be further noted that, there are many ways to retract the operating region. One way is as follows: after the operating region is displayed on the screen of the mobile terminal, if a preset touch operation is received on the text recycling window, the operating region is retracted. For example, referring to FIG. 3, if a preset touch operation is received on the text recycling window 201 in FIG. 3, the operating region 203 is retracted. Another way may be as follows: after the mobile terminal starts the input function and displays the operating region, if the input function is then closed, the operating region is retracted. In this way, it is convenient for the user to retract the operating region at any time. After the operating region is retracted, the screen of the mobile terminal can display other contents, which is convenient for the user to perform other operations on the screen of the mobile terminal.

In the embodiment of the present disclosure, the above mobile terminal may be any mobile terminal including dual cameras, such as a mobile phone, a tablet personal computer, a laptop computer, a personal digital assistant (PDA), a mobile internet device (MID), or a wearable device, etc.

In the text editing method according to the embodiment of the present disclosure, a touch operation of the user on at least one text block displayed in the operating region of the preset text recycling window is detected; if the preset first touch operation is detected, at least one character selected by the first touch operation is pasted to the current position of the cursor in the text editing region; wherein at least one text block to be recycled is stored in the text recycling window. In this way, corresponding characters can be quickly selected from one or more text block and pasted to the current position of the cursor. The user does not need to enter characters one by one, which can solve the problem of tedious operations of character deletion, insertion and modification in the character editing process, thereby enabling the user to complete the text editing quickly.

Figure 5:
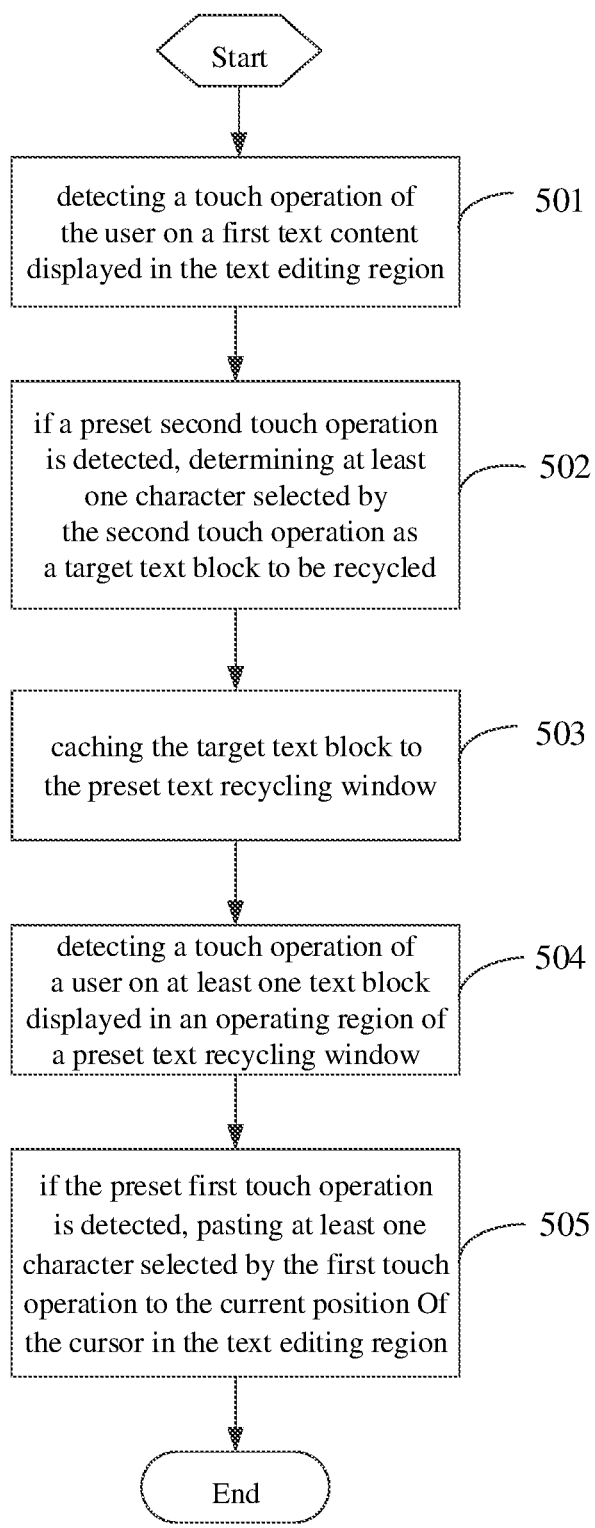
FIG. 5 is a second flow chart of a text editing method according to an embodiment of the present disclosure.

Referring to FIG. 5, it is a flow chart of a text editing method according to an embodiment of the present disclosure. The text editing method may be applied to the mobile terminal. As shown in FIG. 5, the method includes the following steps:

Step 501, detecting a touch operation of the user on a first text content displayed in the text editing region.

Figure 6:
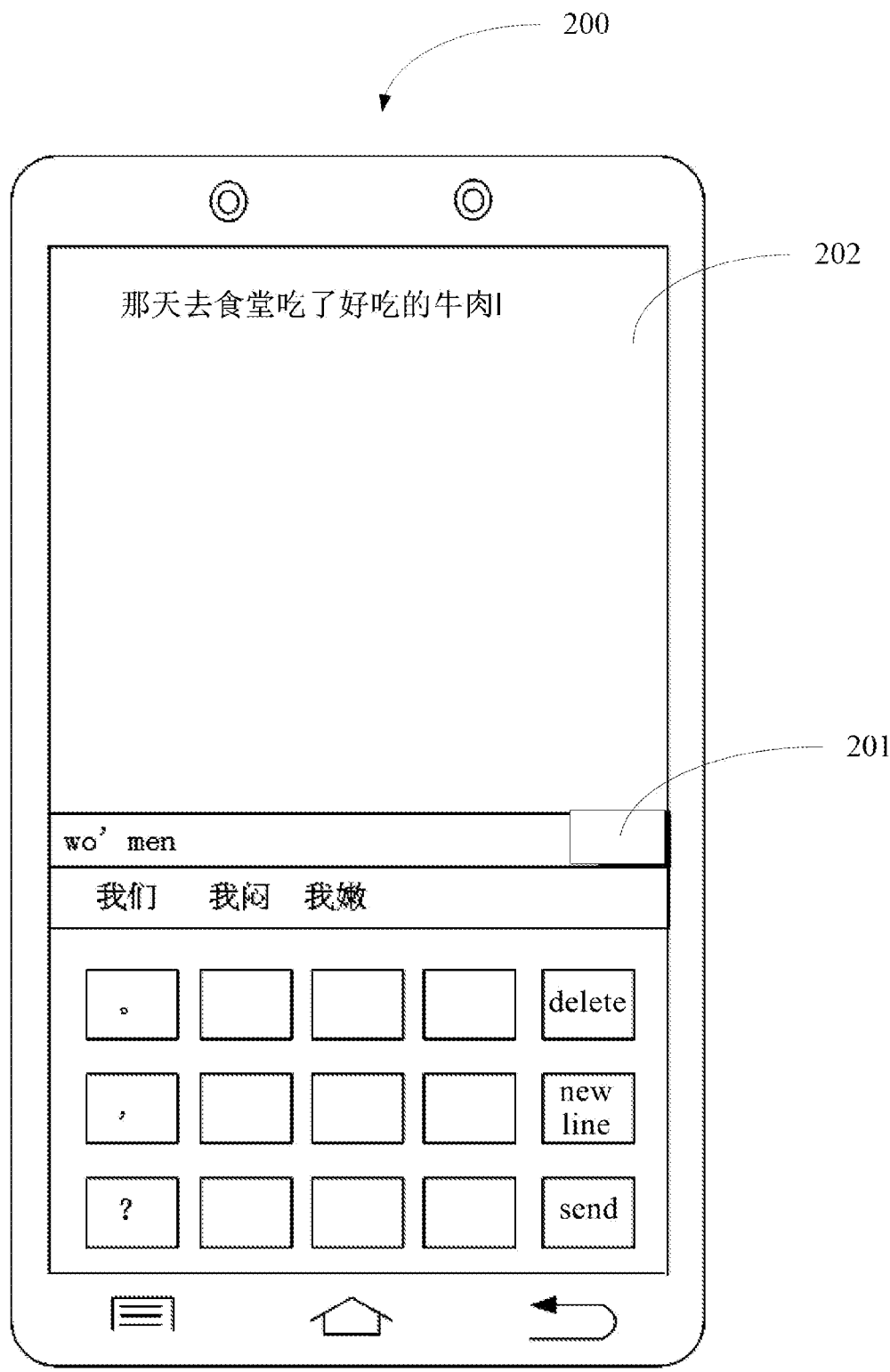
FIG. 6 is a third schematic diagram of a screen of a mobile terminal according to an embodiment of the present disclosure.

In this embodiment, the touch operation may be a clicking operation or a sliding operation. The clicking operation includes a single-clicking operation, a double-clicking operation and a multi-clicking operation. Referring to FIG. 6, it is a third schematic diagram of a mobile terminal according to an embodiment of the present disclosure. As shown, the text recycling window 201 and the text editing region 202 are displayed on the screen of the mobile terminal 200. The text content displayed in the text editing region 202 is "那天去食堂吃了好吃的牛肉", and a touch operation may be detected on the text content "那天去食堂吃了好吃的牛肉" displayed in the text editing region 202.

Step 502, if a preset second touch operation is detected, determining at least one character selected by the second touch operation as a target text block to be recycled.

In this embodiment, the second touch operation includes a sliding operation in a second preset sliding direction and/or a sliding operation with a second preset sliding trajectory, and a clicking operation detected in a second preset character display region. For example, the second touch operation may be a sliding operation with the sliding direction to the left, may be a sliding operation with a length of the sliding trajectory exceeding 2 cm, or may be a single-clicking operation, double-clicking operation or multi-clicking operation received in the character display region in the text editing region.

For example, if the text editing region is the text editing region 202 shown in FIG. 6, and the second touch operation is detected on multiple characters "去 食堂吃了好吃的牛肉" of the text content displayed in the text editing region 202, the multiple characters "去食堂吃了好吃的牛肉" is determined as the target text block to be recycled.

Step 503, caching the target text block to the preset text recycling window.

Figure 7:
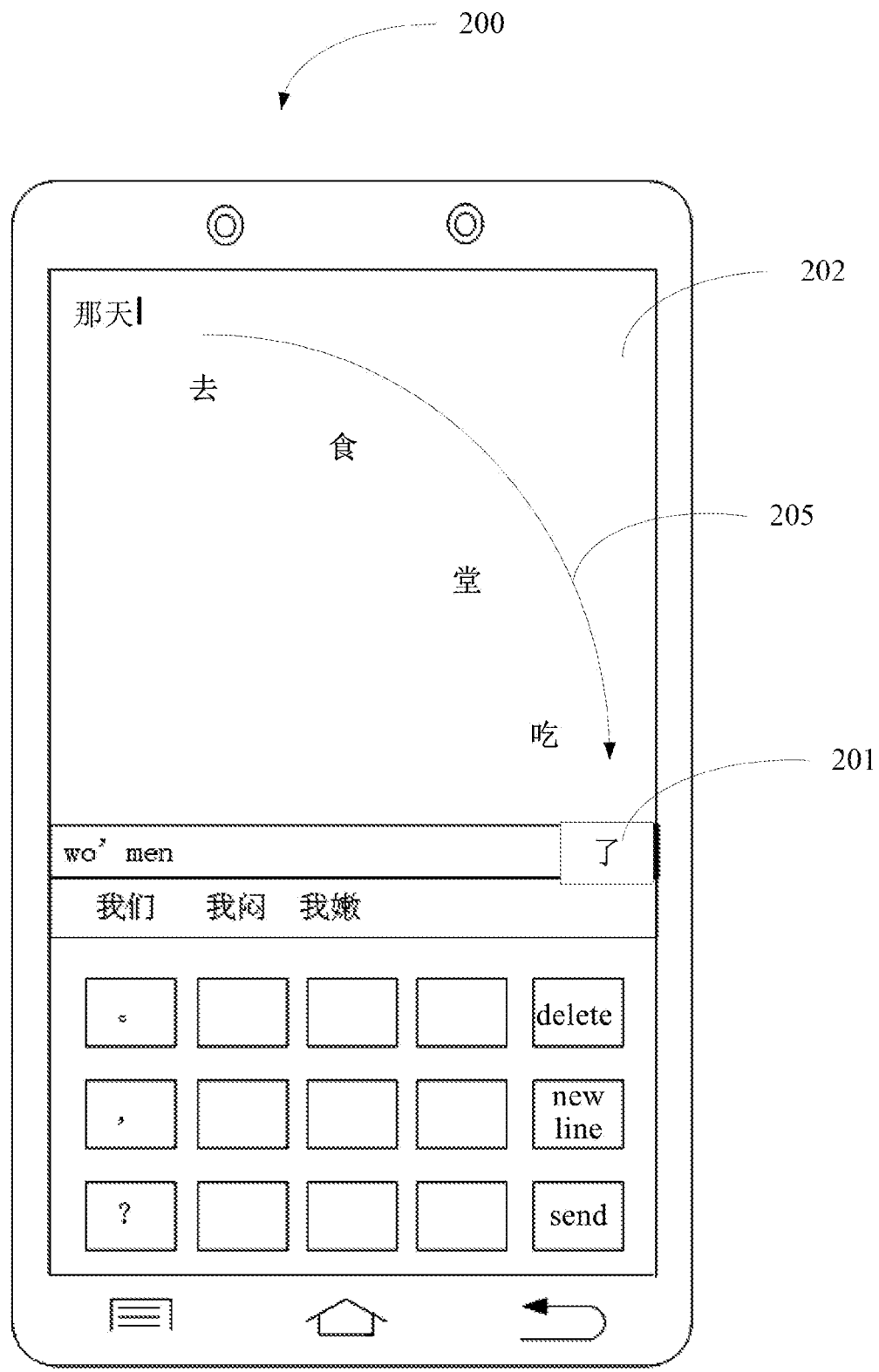
FIG. 7 is a fourth schematic diagram of a screen of a mobile terminal according to an embodiment of the present disclosure.

Referring to FIG. 7, it is a fourth schematic diagram of the screen of a mobile terminal according to an embodiment of the present disclosure. As shown in FIG. 7, the text recycling window 201, the text editing region 202, and a character sliding curve 205 are displayed on the screen of the mobile terminal 200. In this embodiment, if the target text block is "去食堂吃了好吃的牛肉", the target text block "去食堂吃了好吃的牛肉" may be slided into the text recycling window 201 in a character-by-character manner according to the sliding trajectory represented by the character sliding curve 205, and the target text block "去食堂吃了好吃的牛肉" is cached to the text recycling window 201.

Optionally, Step 503 may include the following steps:

judging whether a text block needs to be created;

if a text block needs to be created, creating a target text block based on at least one character selected by the second touch operation, and caching the target text block to the preset text recycling window;

if a text block does not need to be created, caching the target text block to a text block in the preset text recycling window which has a smallest time interval between a creation time thereof and a current time.

For example, if it is judged that a text block needs to be created after the multiple characters "去食堂吃了好吃的牛肉"

are determined in Step 502 as the target text block to be recycled, a target text block is created based on the multiple characters "去食堂吃了好吃的牛肉", and the target text block including the multiple characters "去食堂吃了好吃的牛肉" is cached to the preset text recycling window; on the other hand, if it is judged that a text block does not need to be created after the multiple characters "去食堂吃了好吃的牛肉" are determined in Step 502 as the target text block to be recycled, the multiple characters "去食堂吃了好吃的牛肉" are cached to the text block in the preset text recycling window which has a smallest time interval between a creation time thereof and a current time. In this way, the number of the text blocks in the preset text recycling window can be controlled reasonably, and the storage space in the text block can be utilized effectively.

Optionally, the judging whether a text block needs to be created includes:

detecting whether the second touch operation satisfies a first preset condition; and if it is detected that the second touch operation satisfies the first preset condition, determining that a text block needs to be created, the first preset condition includes at least one of following:

a touch operation previous to the second touch operation is a preset operation;

a time interval between the touch operation previous to the second touch operation and the second touch operation is larger than a first preset duration;

wherein, the previous touch operation is a touch operation which has a smallest time interval between an operation time thereof and an operation time of the second touch operation; the preset operation includes at least one of: an operating region unfolding operation, a text recycling window starting operation, and a text adding operation.

For example, if the second touch operation is detected on the first text content displayed in the text editing region 202 shown in FIG. 6, and the touch operation previous to the detected second touch operation is at least one of the operating region unfolding operation, the text recycling window starting operation, and the text adding operation, then a text block is created; moreover, if the second touch operation is detected on the first text content displayed in the text editing region 202 shown in FIG. 6, and the time interval between the second touch operation and the previous touch operation is larger than the first preset duration, then a text block is created, wherein the first preset duration may be set as 5 second or 8 second, etc.

In this way, during the process of editing the text content in the text editing region, multiple text blocks may be created, and the number of the characters in each text block can be controlled reasonably to facilitate the display of the text blocks in the operating region, and the user can also quickly find the characters to be selected in the displayed text blocks.

Optionally, after Step 503, the method may include the step as follows: numbering the target text block according to the creation time of the target text block.

For example, if the text block has been numbered to the third text block before the target text block is created, the currently created target text block is numbered as the fourth text block, and information such as the number of characters and creation time of the target text block can also be recorded.

In this way, after all the created text blocks have been numbered, a corresponding text block can be found conveniently according to the number of the text block.

Optionally, after Step 503, the method further includes:
acquiring at least one character inputted by the user;
adding the at least one character inputted by the user into the text editing region; and
moving the cursor to the right of a last added character.

Figure 8:
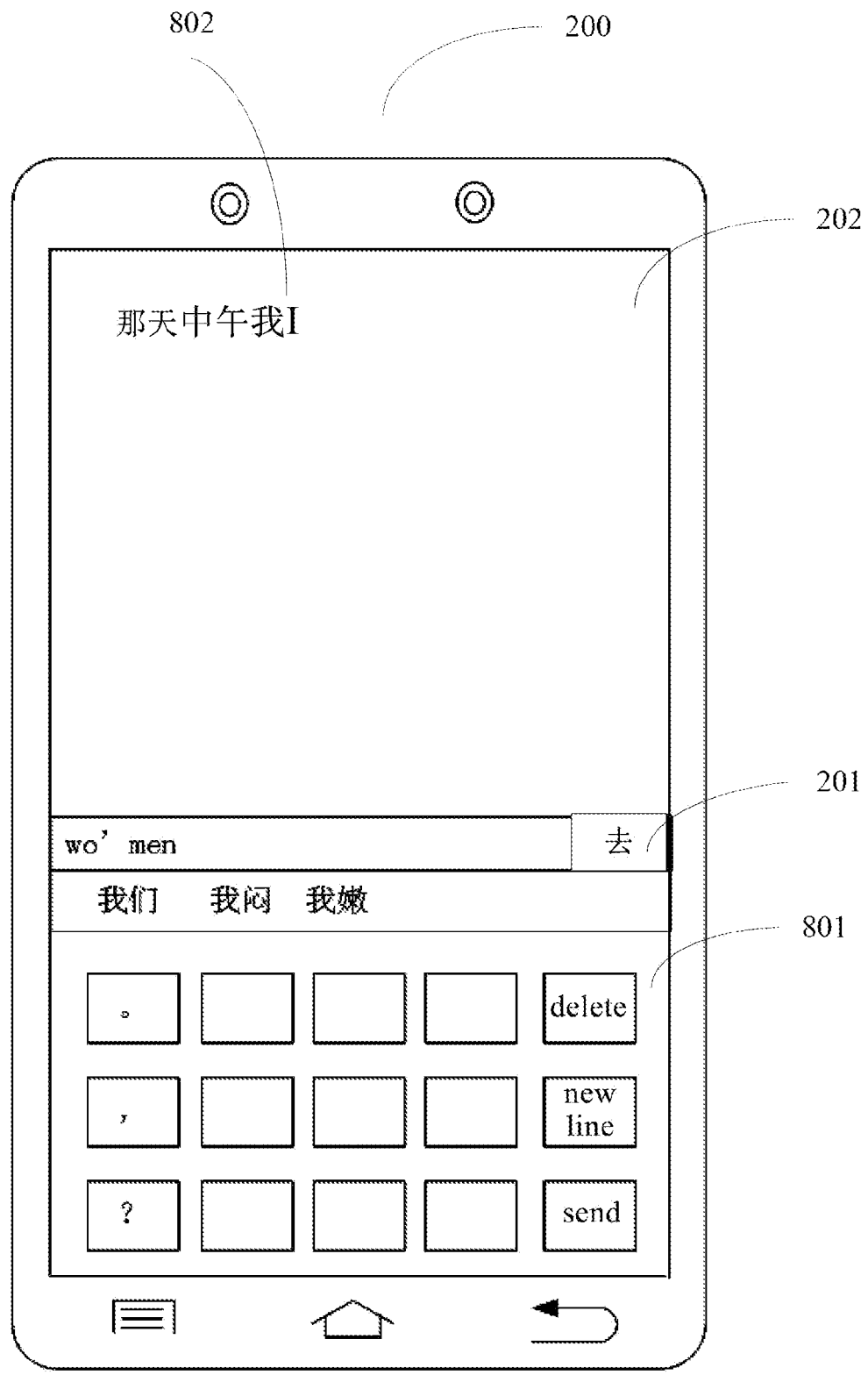
FIG. 8 is a fifth schematic diagram of a screen of a mobile terminal according to an embodiment of the present disclosure.

For example, referring to FIG. 8, it is a fifth schematic diagram of a screen of a mobile terminal according to an embodiment of the present disclosure. FIG. 8 is a schematic diagram of the screen obtained by adding characters in the text editing region 202 shown in FIG. 7. As shown in FIG. 8, a virtual keyboard 801, a cursor 802 and a text editing region 202 are displayed on the screen of the mobile terminal 200. The text recycling window 201 is displayed in the first preset region of the virtual keyboard 801. The cursor 802 is used to prompt the user for the position of entering a character. In the text editing region 202 shown in FIG. 7, three characters "中午我" are added by entering them through the virtual keyboard 801, thereby obtaining the text content "那天中午我" in the text editing region shown in FIG. 8, wherein the three characters "那天中午我" can be displayed by a preset highlighted display manner, such as by bolding or highlighting. In this way, it is convenient for the user to add characters into the text editing region and increase the speed of the user to add characters.

Step 504, detecting a touch operation of a user on at least one text block displayed in an operating region of a preset text recycling window.

Step 504 may include the following step:
pasting at least one character selected by the first touch operation to the current position of the cursor in the text editing region to generate a second text content;
wherein the at least one character inputted by the user in the text editing region is displayed in a preset highlighted display manner, and/or, the at least one character selected by the first touch operation in the text editing region is displayed in a preset highlighted display manner.

Figure 9:
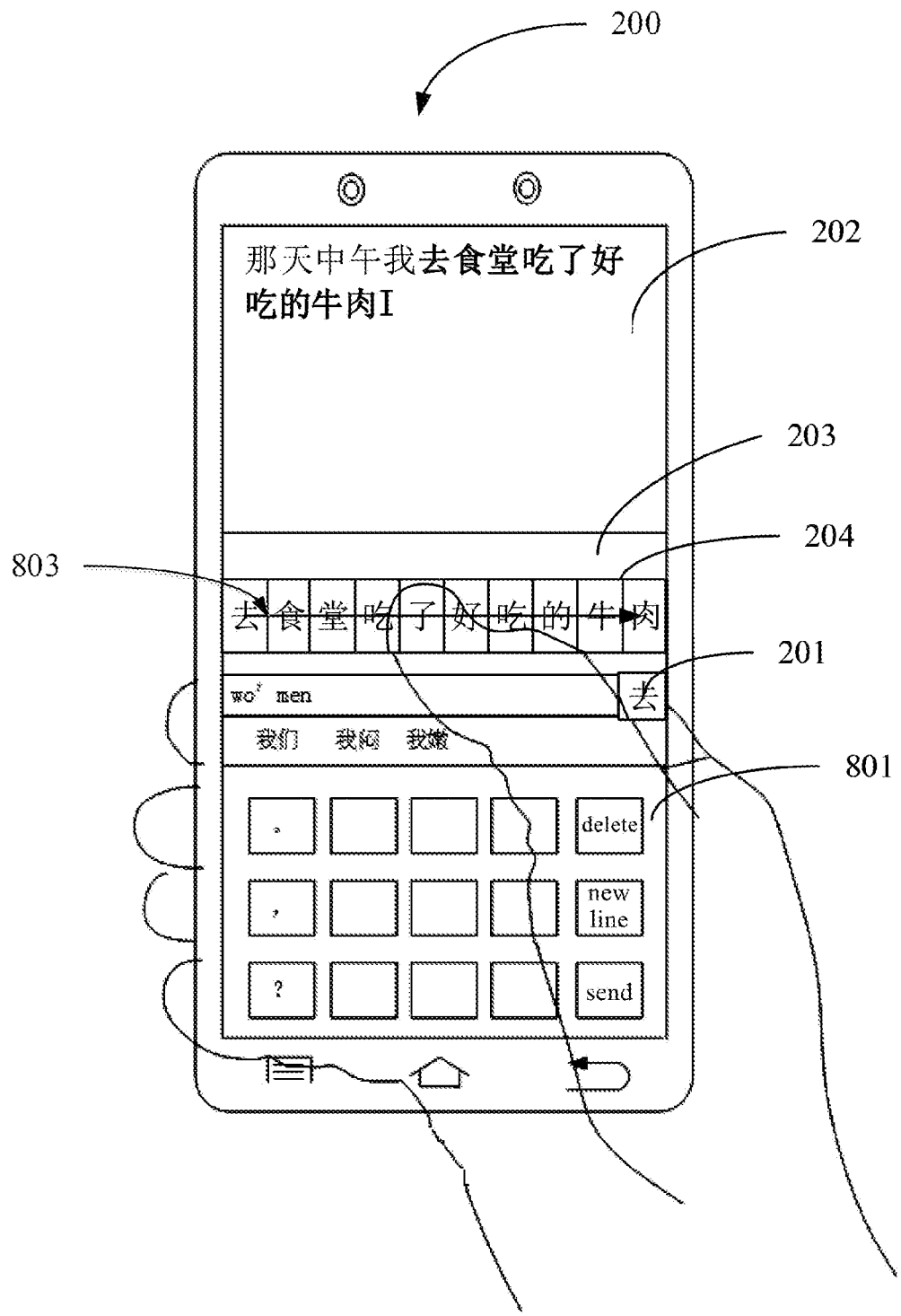
FIG. 9 is a sixth schematic diagram of a screen of a mobile terminal according to an embodiment of the present disclosure.

For example, referring to FIG. 9, it is a sixth schematic diagram of a screen of a mobile terminal according to an embodiment of the present disclosure. FIG. 9 is a schematic diagram of the screen obtained by pasting a text block in the text editing region 202 shown in FIG. 8. As shown in FIG. 9, a virtual keyboard 801, a text editing region 202, an operating region 203, a text block 204 and a sliding trajectory 803 are displayed on the screen of the mobile terminal 200. If the first touch operation is the corresponding sliding operation generating the sliding trajectory 803, the selected at least one character is "去食堂吃了好吃的牛肉" in the text block 204, and then the characters "去食堂吃了好吃的牛肉" are pasted to the text editing region 202 to obtain the second text content "那天中午我去食堂吃牛肉", wherein the several characters "去食堂吃了好吃的牛肉" may be displayed by a preset highlighted display manner such as bolding or highlighting. In this way, at least one word selected by the first touch operation may be pasted in the text editing region, and the user does not need to enter characters one by one, which reduces the steps for the user to enter characters and improves the speed to generate the text content.

Optionally, before Step 504, the method may further include the follow step: displaying the text recycling window.

Optionally, the displaying the text recycling window may include the following steps:

detecting whether an input method function is invoked;

if it is detected that the input method function is invoked, displaying a virtual keyboard; and displaying the text recycling window in a first preset region of the virtual keyboard.

In this embodiment, when it is detected that the input method function is invoked, the screen of the mobile terminal is changed correspondingly. For example, referring to FIG. 8 again, when it is detected that the input method function is invoked, the virtual keyboard 801 and the text editing region 202 are displayed on the screen of the mobile terminal. The text recycling window 201 is displayed in the first preset region of the virtual keyboard 801. The mobile terminal 200 starts the input method, and multiple characters "那天中午我" are inputted in the text editing region. In this way, the text recycling window is displayed on the virtual keyboard, which can prompt the user to perform text editing using the text recycling window currently, and the user can perform subsequent operations on the text recycling window quickly.

Optionally, the step of displaying the text recycling window may include the following step: if a text recycling function starting instruction inputted by the user is received, displaying the text recycling window in a second preset region of the current display interface.

In this embodiment, any program interface may display the text recycling window. For example, the text recycling window may be displayed on the chat interface of the instant messaging application according to the received text recycling function starting instruction input by the user, or may be displayed on the office application interface according to the received text recycling function starting instruction input by the user.

In this embodiment, a text recycling button may be displayed on the current display interface, and a touch instruction received by the text recycling button may be used as the text recycling function starting instruction input by the user. Thus, when the user needs to perform text editing, he/she can manually input the text recycling function starting instruction to the mobile terminal to make the text recycling window to be displayed, and perform subsequent operations on the text recycling window, which may improve the flexibility of displaying the text recycling window.

Optionally, after the text recycling window is displayed, the method may further include the following step: if it is detected that an input method function is closed or a text recycling function closing instruction input by the user is received, eliminating display of the text recycling window.

In this way, after the user completes text editing or when the user does not need to use the text recycling window, the display of the text recycling window may be eliminated, which saves the screen display space of the mobile terminal and facilitates displaying other content on the screen of the mobile terminal.

Optionally, after the step of displaying the text recycling window and before Step 504, the method may further include the following steps:

detecting the touch operation of the user on the text recycling window;

if a preset third touch operation is detected, unfolding the operating region of the text recycling window; and displaying at least one text block in the operating region according to a numerical sequence.

In this embodiment, the third touch operation includes a sliding operation in a third preset sliding direction and/or a sliding operation with a third preset sliding trajectory, and a clicking operation detected in the text recycling window. For example, the third touch operation may be a sliding operation in the upward sliding direction, may be a sliding operation with a length of the sliding trajectory exceeding 1 cm, or may be a single-clicking operation, double-clicking operation or multi-clicking operation received on the text recycling window.

Specifically, referring to FIGS. 3 to 4 again, as shown in FIG. 3, the text block 204 is displayed in the operating region 203 in numerical sequence, and as shown in FIG. 4, the first text block 401, the second text block 402 and the third text block 403 are displayed in the operating region 203 in numerical sequence.

In this way, at least one text block may be displayed in the operating region in numerical sequence to facilitate the user to select a corresponding character from the text block and quickly complete the character pasting operation.

Optionally, the displaying at least one text block in the operating region in numerical sequence includes:

determining at least one text block satisfying a second preset condition; and displaying the at least one text block in the operating region in numerical sequence.

Optionally, the at least one text block satisfying the second preset condition includes at least one of:

at least one text block having a time interval between a creation time thereof and a current time smaller than a second preset duration; and at least one text block having a word number larger than a preset threshold.

In this embodiment, the second preset duration may be 1 minute, 2 minute, etc., and the preset threshold may be 10 or 15, etc., which will not be limited here.

In this way, the user may display at least one text block whose creation time is closer to the current time in the operating region as required, or the user may display at least one text block with a larger number of characters in the operating region as required. Thus, a variety of ways to display text blocks are provided to meet the different needs of users in the text editing process.

Optionally, the displaying at least one text block includes:

displaying at least one text block in a formatted display manner.

In this embodiment, the formatted display manner displays only the content attribute corresponding to the characters in the text block, and does not display the format attribute. In this way, the display effect of the at least one text block in the operating region is better, which is convenient for a user to view.

Optionally, the displaying at least one text block in a formatted display manner includes:

displaying at least one text block in a grid alignment manner;

wherein each character in each text block corresponds to a grid.

Figure 10:
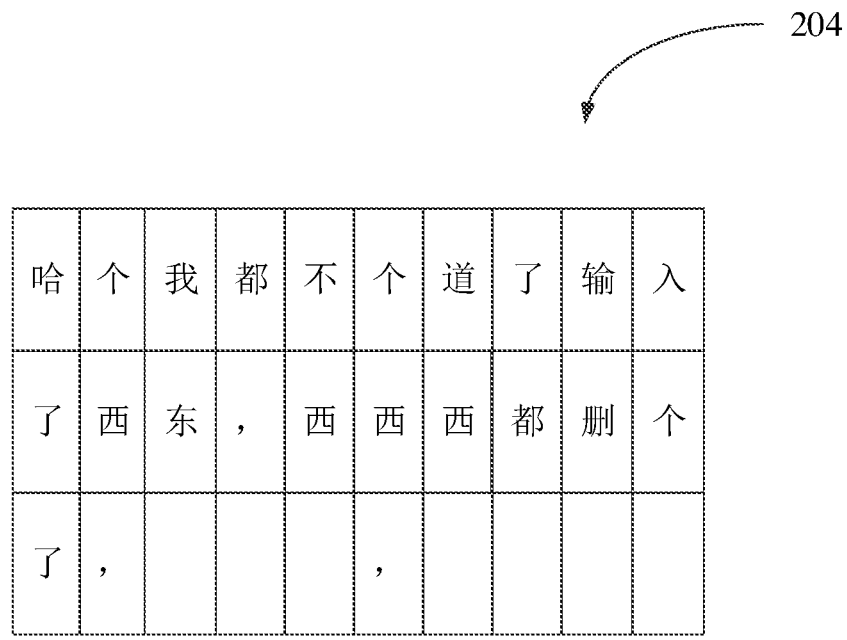
FIG. 10 is a schematic diagram of text blocks displayed in grid alignment according to an embodiment of the present disclosure.

For example, referring to FIG. 10, it is a schematic diagram of provided text blocks displayed in grid alignment. As shown in FIG. 10, the text block 204 has 30 grids with 3 rows and 10 columns, and one character is displayed in each grid.

In this way, each character in each text block corresponds to a grid, it is convenient for the user to accurately select a character from the text block, which reduces misoperations in the character selection process, and improves the accuracy of character selection.

In this embodiment, after Step 504, the method may further include the following step:

if a preset first touch operation is detected, highlighting the grid corresponding to each character selected by the first touch operation with a third preset duration.

In this way, the grid corresponding to the selected character is set to be highlighted for the third preset duration, which can prompt the user for the currently selected character, and guide the user to select the correct character.

Step 505, if the preset first touch operation is detected, pasting at least one character selected by the first touch operation to the current position of the cursor in the text editing region.

The implementation process and beneficial effects of this step can be referred to the description of Step 102, and will not be repeated here.

In the text editing method according to the embodiment of the present disclosure, a touch operation of the user on a first text content displayed in the text editing region is detected; if a preset second touch operation is detected, at least one character selected by the second touch operation is determined as a target text block to be recycled; the target text block is cached to the preset text recycling window; a touch operation of a user on at least one text block displayed in an operating region of a preset text recycling window is detected; if the preset first touch operation is detected, at least one character selected by the first touch operation is pasted to the current position of the cursor in the text editing region; wherein at least one text block to be recycled is stored in the text recycling window. In this way, by caching at least one character selected by the second touch operation to the preset text recycling window as the target text block, selecting at least one character from the text block displayed in the operating region in the preset text recycling window according to the first touch operation, and pasting the selected at least one character to the current position of the cursor in the text editing region, the text block can be recycled effectively. During the text editing process, by displaying the recycled text block, and pasting the corresponding character selected from the text block quickly to the current position of the cursor, the user does not need to enter characters one by one, which can solve the problem of tedious operations of character deletion, insertion and modification in the character editing process, thereby enabling the user to complete the text editing quickly and improving the speed of text editing.

Figure 11:
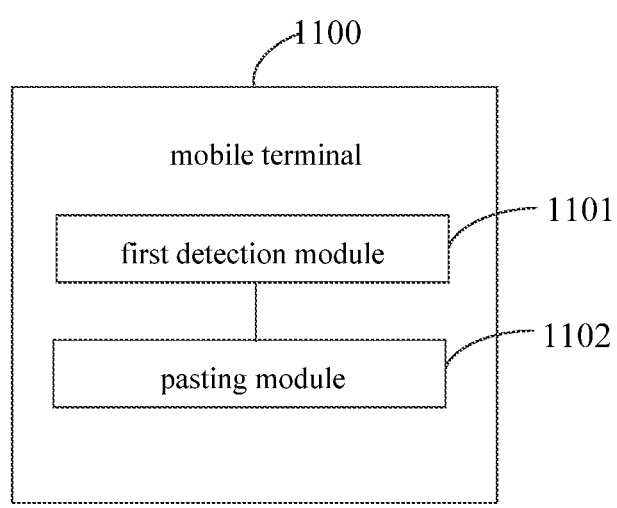
FIG. 11 is a first structural diagram of a mobile terminal according to an embodiment of the present disclosure.
Figure 12:
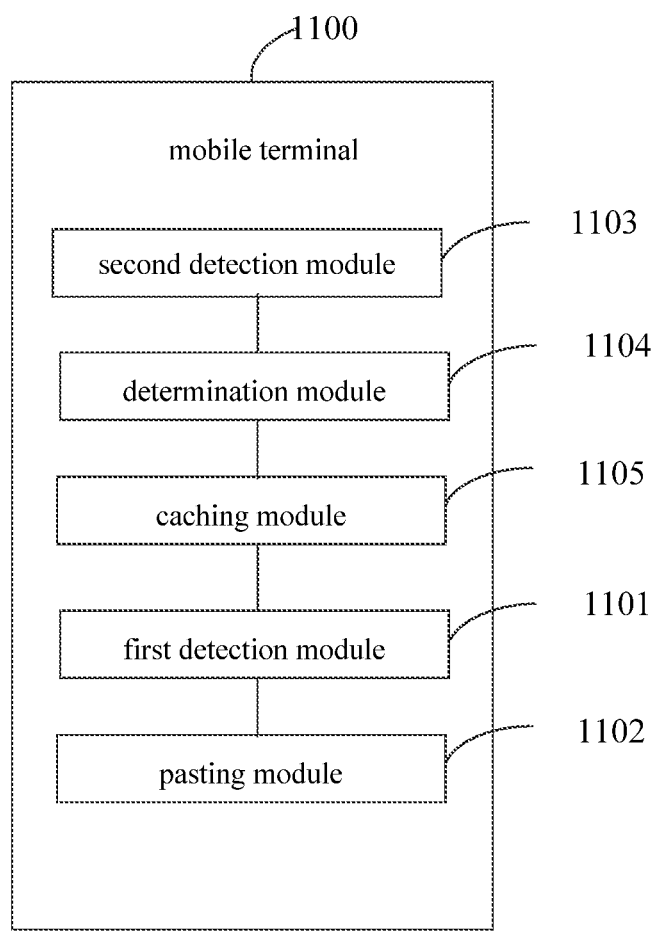
FIG. 12 is a second structural diagram of a mobile terminal according to an embodiment of the present disclosure.

Referring to FIG. 11, it is a structural diagram of a mobile terminal according to an embodiment of the present disclosure. As shown in FIG. 11, the mobile terminal 1100 includes a first detection module 1101 and a pasting module 1102, and the first detection module 1101 is connected to the pasting module 1102;

the first detection module 1101 is configured to detect a touch operation of a user on at least one text block displayed in an operating region of a preset text recycling window; and the pasting module 1102 is configured to, if a preset first touch operation is detected, paste at least one character selected by the first touch operation to the current position of the cursor in a text editing region;

wherein at least one text block to be recycled is stored in the text recycling window. Optionally, as shown in FIG. 12, the mobile terminal 1100 further includes:

a second detection module 1103 configured to detect a touch operation of the user on a first text content displayed in the text editing region;

a determination module 1104 configured to, if a preset second touch operation is detected, determine at least one character selected by the second touch operation as a target text block to be recycled; and a caching module 1105 configured to cache the target text block to the preset text recycling window.

Figure 13:
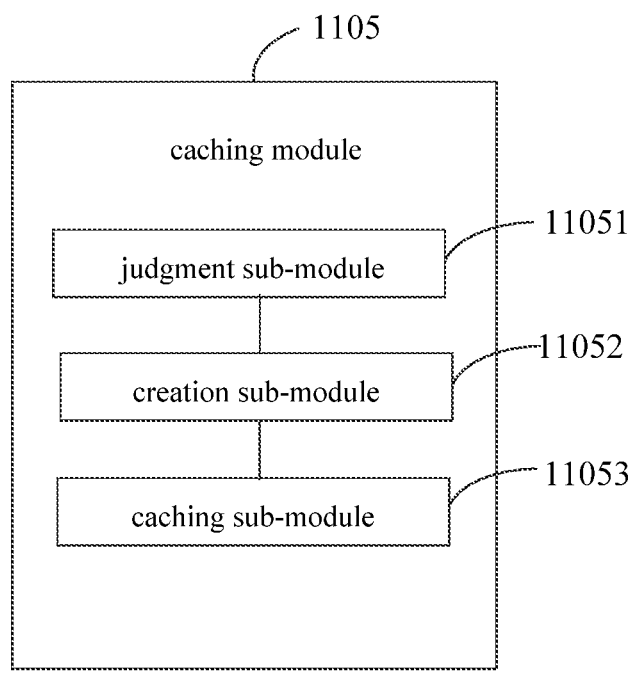
FIG. 13 is a structural diagram of a caching module in a mobile terminal according to an embodiment of the present disclosure.

Optionally, as shown in FIG. 13, the caching module 1105 includes:

a judgment sub-module 11051 configured to judge whether a text block needs to be created;

a creation sub-module 11052 configured to, if a text block needs to be created, create a target text block based on at least one character selected by the second touch operation, and cache the target text block to the preset text recycling window;

a caching sub-module 11053 configured to, if a text block does not need to be created, cache the target text block to a text block in the preset text recycling window which has a smallest time interval between a creation time thereof and a current time.

Figure 14:
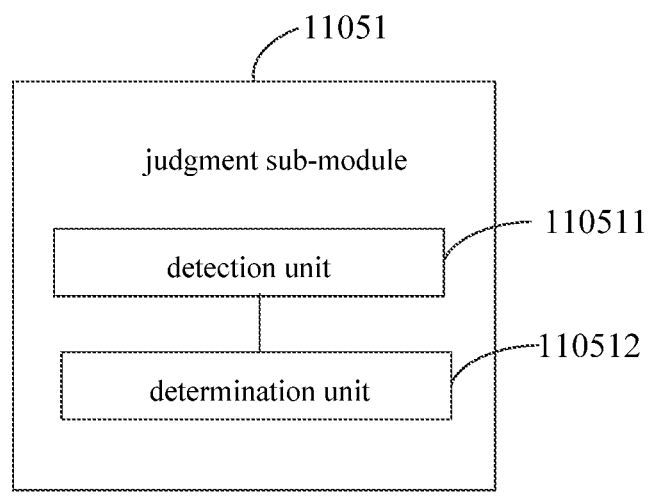
FIG. 14 is a structural diagram of a judgment sub-module in a mobile terminal according to an embodiment of the present disclosure.
Figure 15:
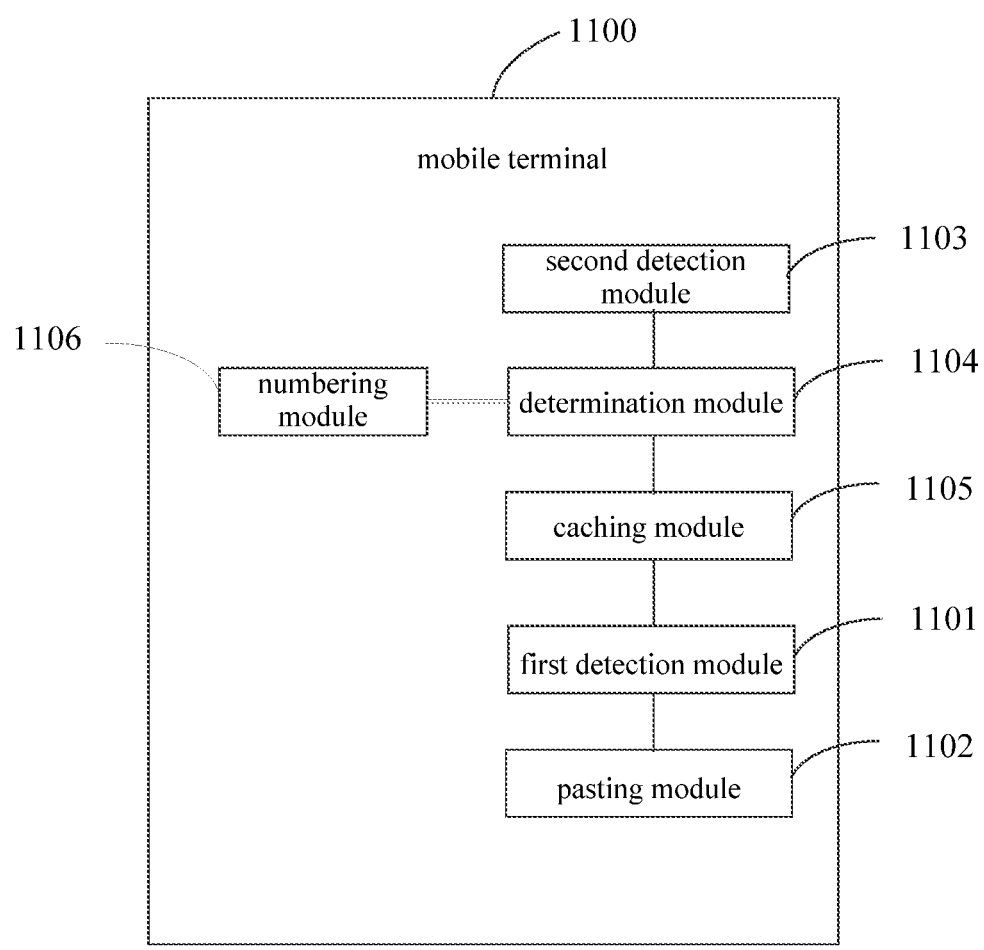
FIG. 15 is a third structural diagram of a mobile terminal according to an embodiment of the present disclosure.

Optionally, as shown in FIG. 14, the judgment sub-module 11051 includes:

a detection unit 110511 configured to detect whether the second touch operation satisfies a first preset condition; and a determination unit 110512 configured to, if it is detected that the second touch operation satisfies the first preset condition, determine that a text block needs to be created, the first preset condition includes at least one of following:

a touch operation previous to the second touch operation is a preset operation;

a time interval between the touch operation previous to the second touch operation and the second touch operation is larger than a first preset duration;

wherein, the previous touch operation is a touch operation which has a smallest time interval between an operation time thereof and an operation time of the second touch operation; the preset operation comprises at least one of: an operating region unfolding operation, a text recycling window starting operation, and a text adding operation. Optionally, as shown in FIG. 15, the mobile terminal 1100 further includes:

a numbering module 1106 configured to number the target text block according to a creation time of the target text block.

Figure 16:
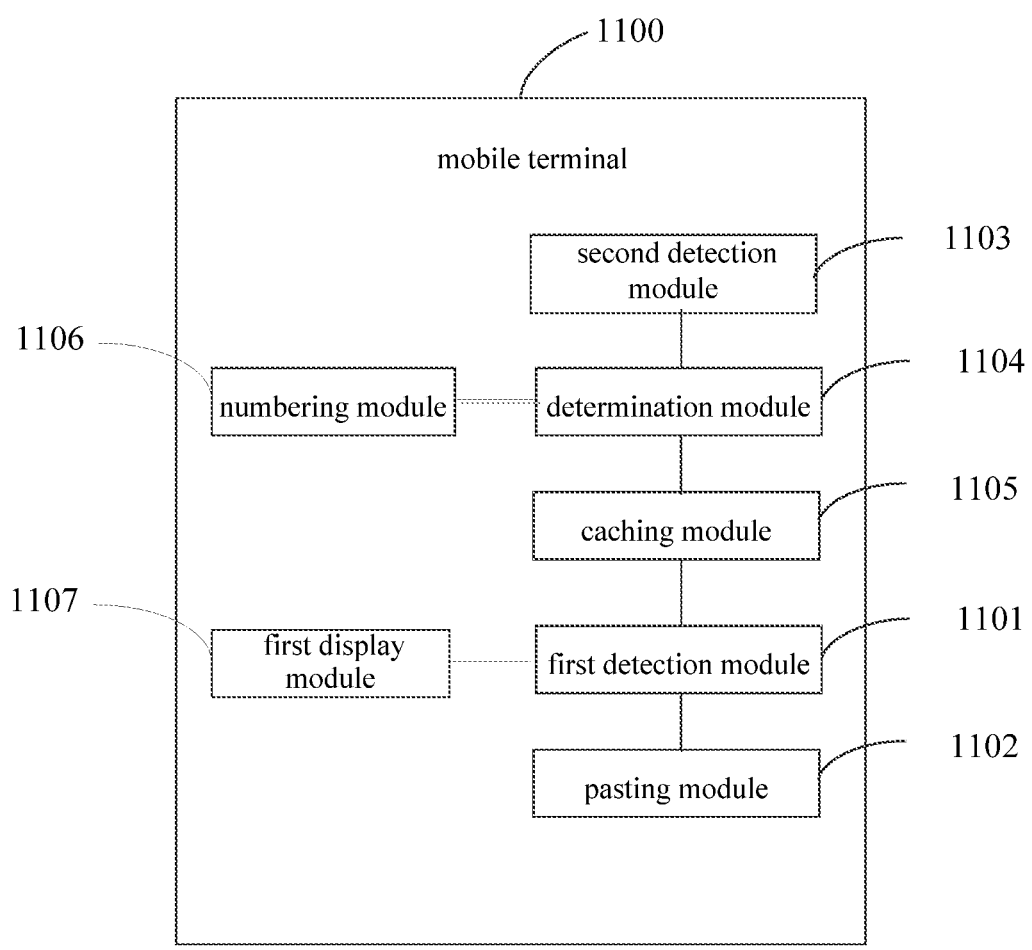
FIG. 16 is a fifth structural diagram of a mobile terminal according to an embodiment of the present disclosure.

Optionally, as shown in FIG. 16, the mobile terminal 1100 further includes:

a first display module 1107 configured to display the text recycling window.

Figure 17:
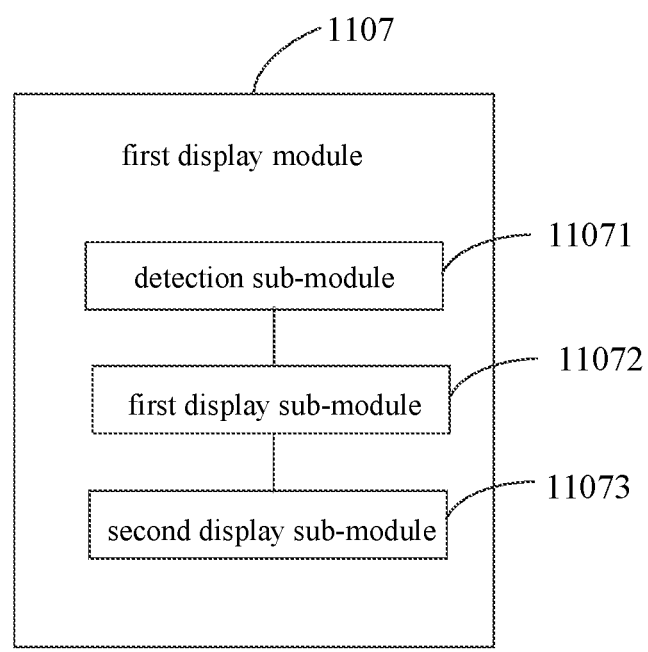
FIG. 17 is a structural diagram of a first display module in a mobile terminal according to an embodiment of the present disclosure.

Optionally, as shown in FIG. 17, the first display module includes:

a detection sub-module 11071 configured to detect whether an input method function is invoked;

a first display sub-module 11072 configured to, if it is detected that the input method function is invoked, display a virtual keyboard; and a second display sub-module 11073 configured to display the text recycling window in a first preset region of the virtual keyboard. Optionally, the first display module 1107 is further configured to, if a text recycling function starting instruction input by the user is received, display the text recycling window in a second preset region of the current display interface.

Figure 18:
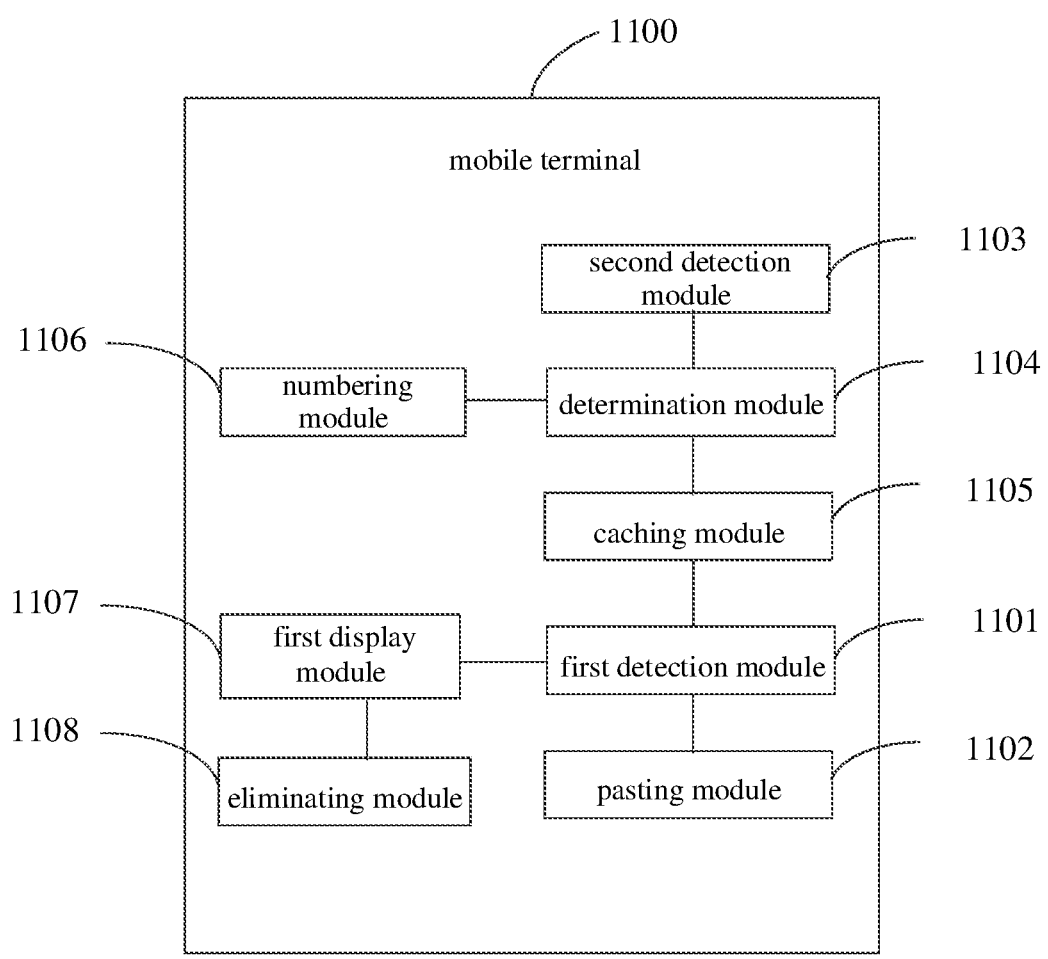
FIG. 18 is a sixth structural diagram of a mobile terminal according to an embodiment of the present disclosure.

Optionally, as shown in FIG. 18, the mobile terminal 1100 further includes:

an eliminating module 1108 configured to, if it is detected that an input method function is closed or a text recycling function disabling instruction input by the user is received, eliminate display of the text recycling window.

Figure 19:
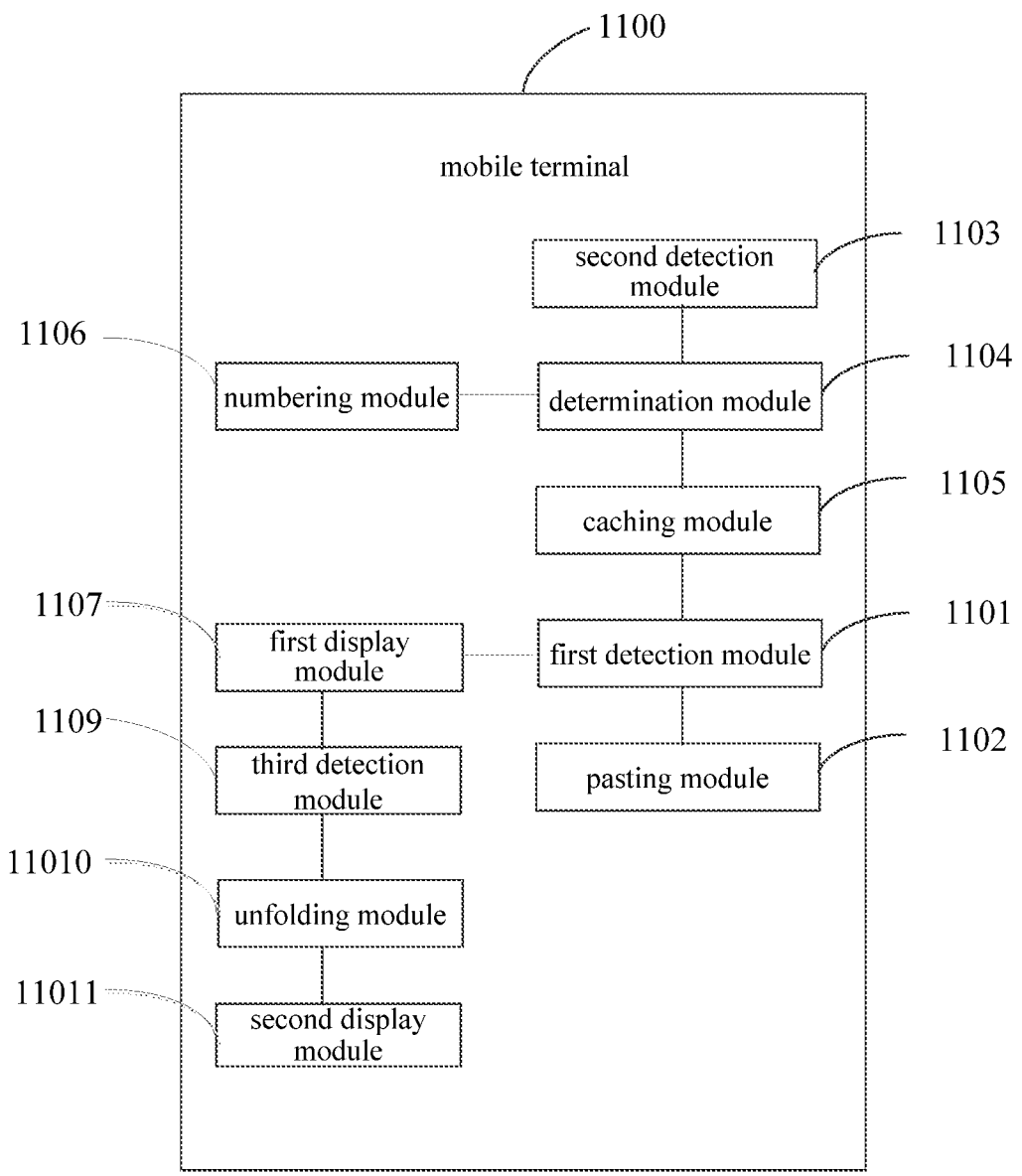
FIG. 19 is a seventh structural diagram of a mobile terminal according to an embodiment of the present disclosure.

Optionally, as shown in FIG. 19, the mobile terminal 1100 further includes:

a third detection module 1109 configured to detect the touch operation of the user on the text recycling window;

an unfolding module 11010 configured to, if a preset third touch operation is detected, unfold the operating region of the text recycling window; and a second display module 11011 configured to display at least one text block in the operating region in numerical sequence.

Figure 20:
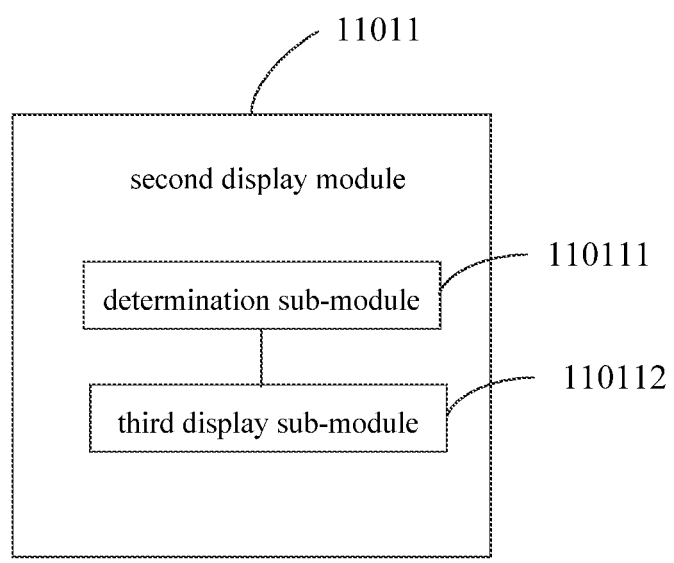
FIG. 20 is a structural diagram of a second display module in a mobile terminal according to an embodiment of the present disclosure.

Optionally, as shown in FIG. 20, the second display module 11011 includes:

a determination sub-module 110111 configured to determine at least one text block satisfying a second preset condition; and a third display sub-module 110112 configured to display the at least one text block in the operating region in numerical sequence.

Optionally, the at least one text block satisfying the second preset condition includes at least one of:

at least one text block having a time interval between a creation time thereof and a current time smaller than a second preset duration; and at least one text block having a word number larger than a preset threshold.

Optionally, the second display module 11011 is further configured to display at least one text block in a formatted display manner.

Optionally, the second display module 11011 is further configured to display at least one text block in a grid alignment manner;

wherein each character in each text block corresponds to a grid.

Figure 21:
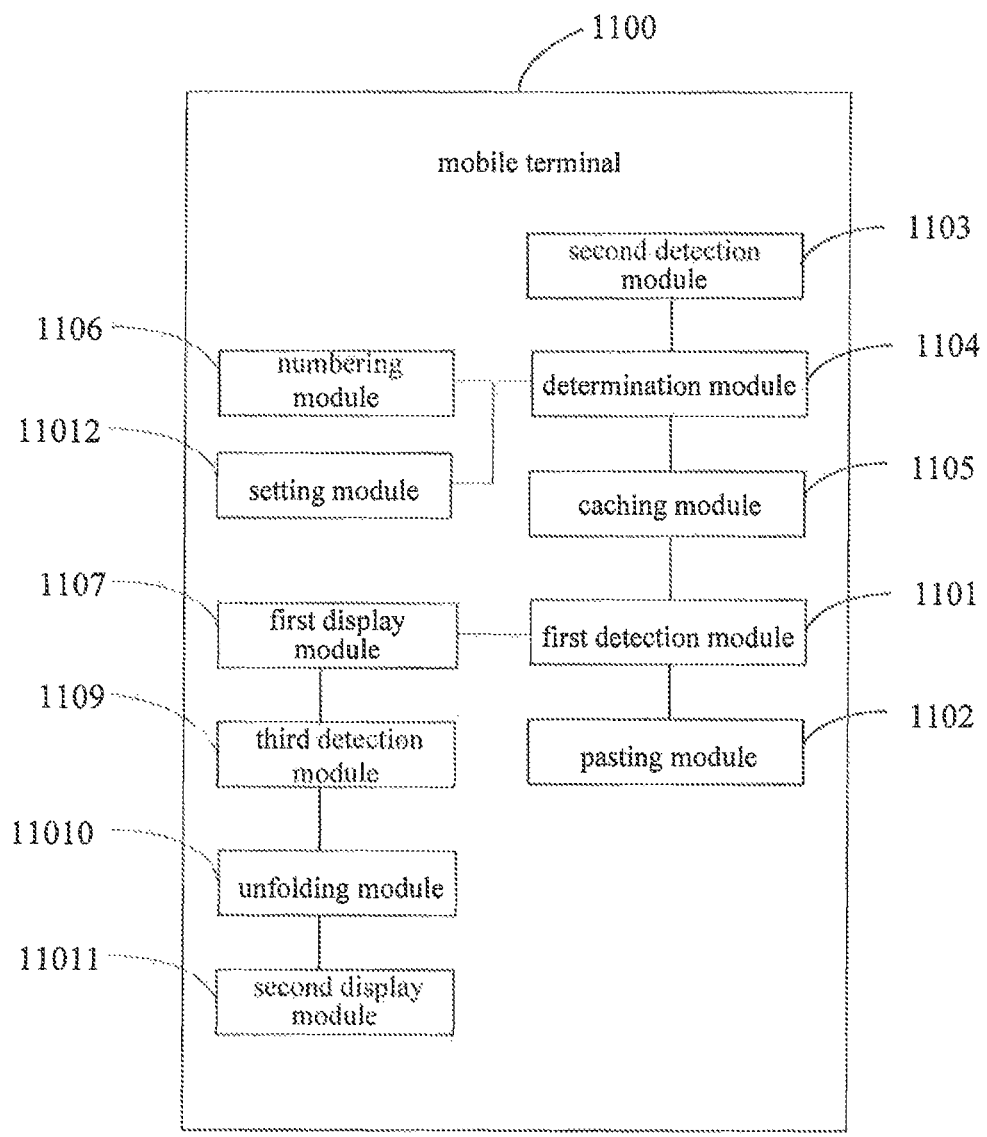
FIG. 21 is an eighth structural diagram of a mobile terminal according to an embodiment of the present disclosure.

Optionally, as shown in FIG. 21, the mobile terminal 1100 further includes:

a setting module 11012 configured to, if the preset first touch operation is detected, highlight the grid corresponding to each character selected by the first touch operation for a third preset duration.

Figure 22:
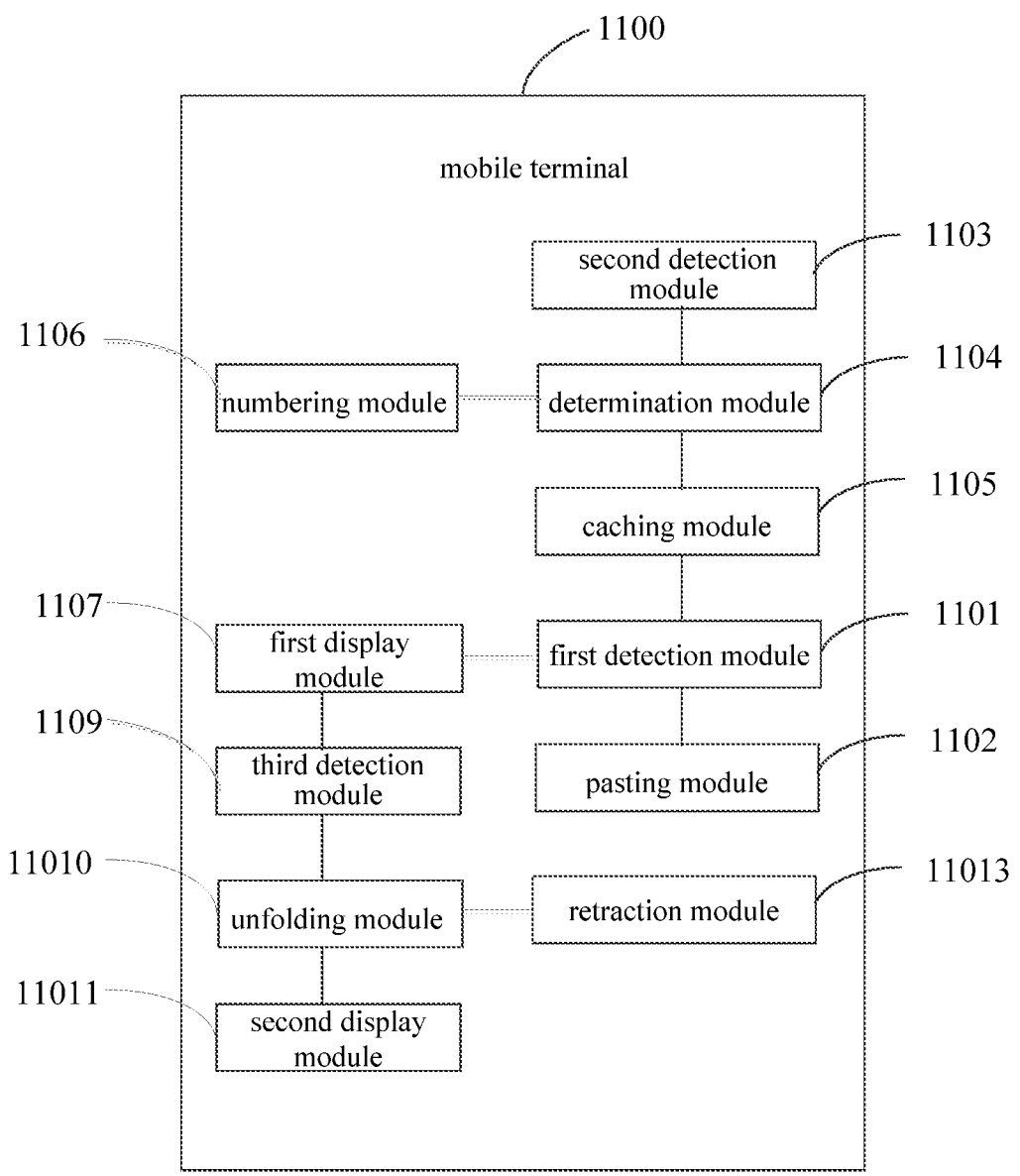
FIG. 22 is a ninth structural diagram of a mobile terminal according to an embodiment of the present disclosure.

Optionally, as shown in FIG. 22, the mobile terminal 1100 further includes:

a retraction module 11013 configured to, if an operating region retraction instruction input by the user is received, retract the operating region of the text recycling window.

Figure 23:
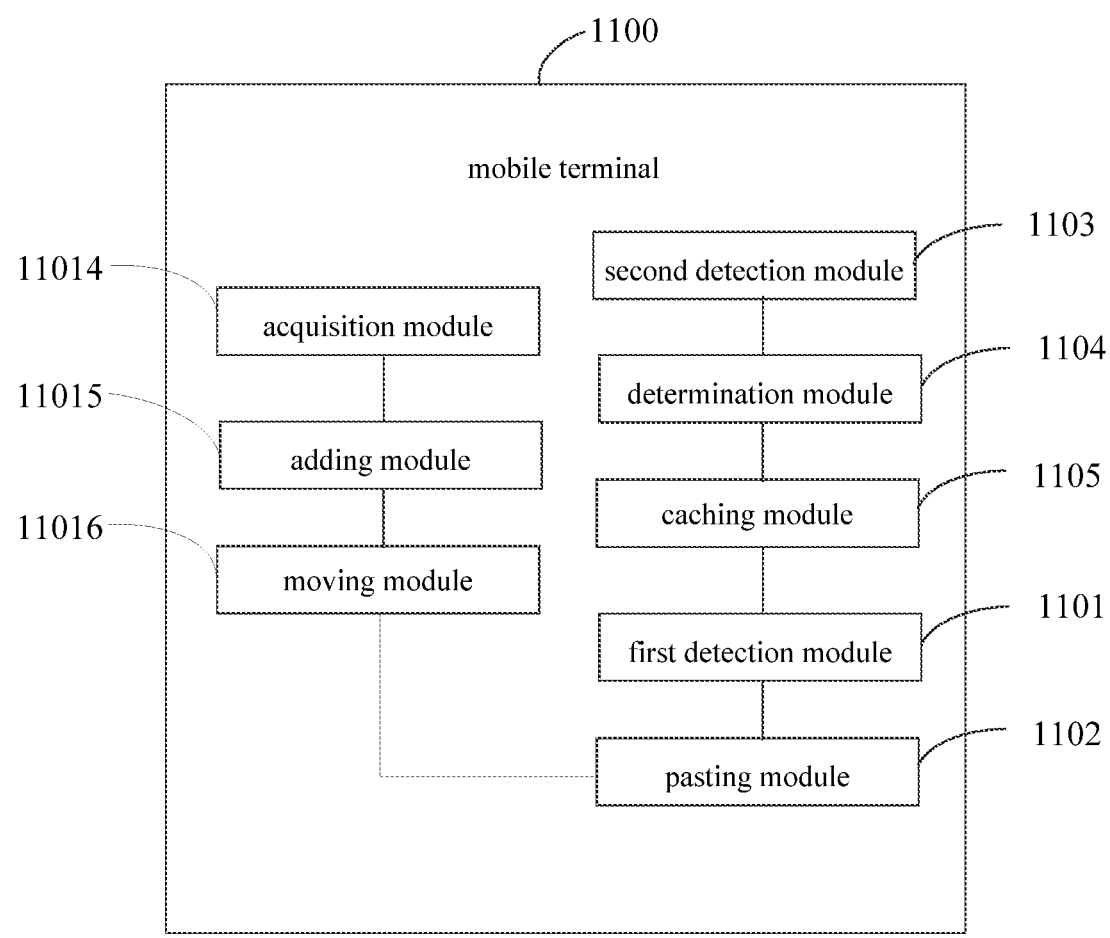
FIG. 23 is a tenth structural diagram of a mobile terminal according to an embodiment of the present disclosure.

Optionally, as shown in FIG. 23, the mobile terminal 1100 further includes:

an acquisition module 11014 configured to acquire at least one character inputted by the user;

an adding module 11015 configured to add the at least one character inputted by the user into the text editing region; and a moving module 11016 configured to move the cursor to the right of a last added character, the pasting module 1102 is further configured to paste at least one character selected by the first touch operation to the current position of the cursor in a text editing region to generate a second text content, wherein the at least one character inputted by the user in the text editing region is displayed in a preset highlighted display manner, and/or, the at least one character selected by the first touch operation in the text editing region is displayed in a preset highlighted display manner.

The mobile terminal 1100 can implement the processes implemented by the mobile terminals in the method embodiments of FIGS. 1 and 5. To avoid repetition, details are not described herein again.

The mobile terminal 1100 provided by the embodiment of the present disclosure can quickly select a corresponding character from the text block and paste it to the current position of the cursor, and the user does not need to enter characters one by one, which can solve the problem of tedious operations of character deletion, insertion and modification in the character editing process, thereby enabling the user to complete the text editing quickly.

Figure 24:
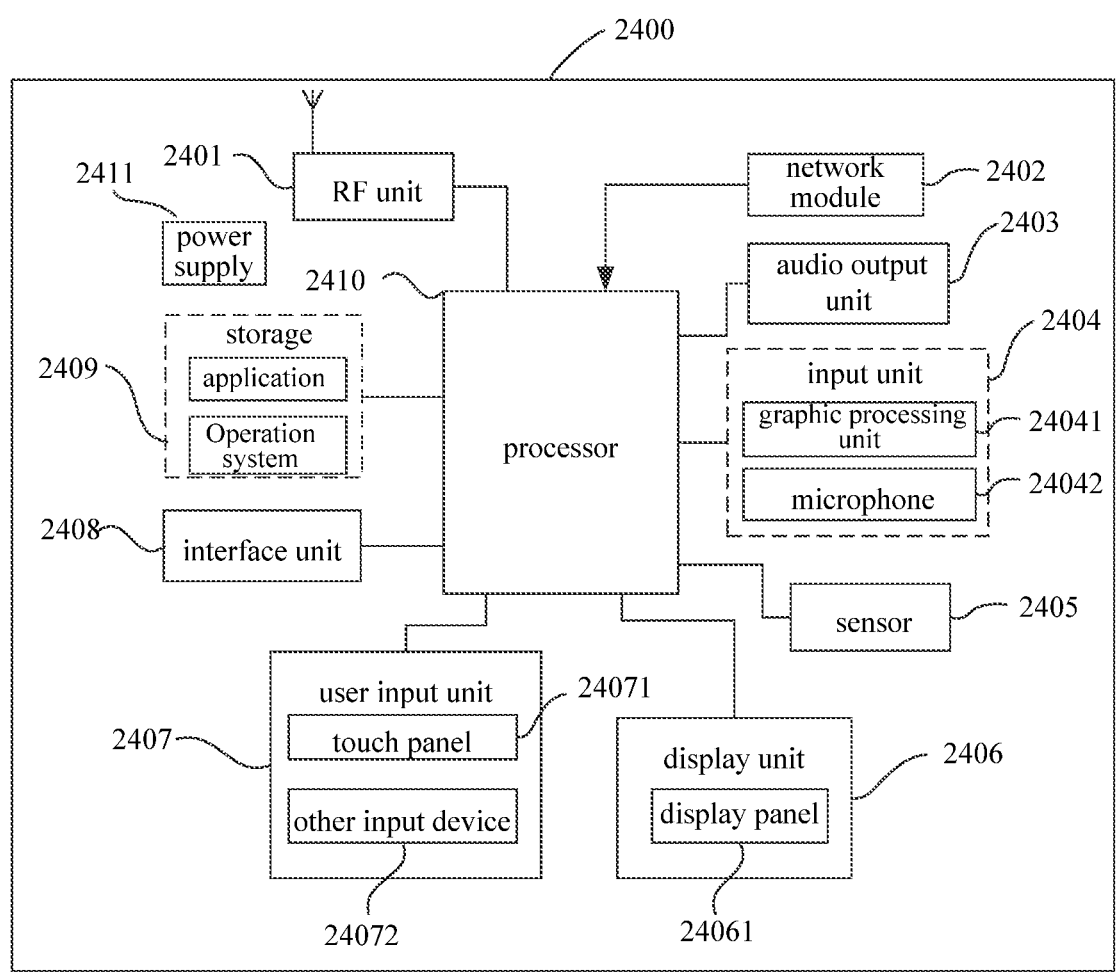
FIG. 24 is an eleventh structural diagram of a mobile terminal according to an embodiment of the present disclosure.

FIG. 24 is a schematic diagram of a hardware structure of a mobile terminal implementing various embodiments of the present disclosure. The mobile terminal includes (but not limited thereto): a radio frequency unit 2401, a network module 2402, an audio output unit 2403, an input unit 2404, a sensor 2405, a display unit 2406, a user input unit 2407, an interface unit 2408, a storage 2409, a processor 2410, and power supply 2411 and other components. Those skilled in the art may understand that the structure of the mobile terminal shown in FIG. 24 does not constitute a limitation on the mobile terminal, and the mobile terminal may include more or fewer components than those illustrated, or combine certain components, or have different component arrangement. In the embodiments of the present disclosure, mobile terminals include but are not limited to mobile phones, tablet computers, notebook computers, palmtop computers, in-vehicle terminals, wearable devices, and pedometers, etc.

The processor 2410 is configured to detect a touch operation of a user on at least one text block displayed in an operating region of a preset text recycling window; if a preset first touch operation is detected, paste at least one character selected by the first touch operation to the current position of the cursor in a text editing region; wherein at least one text block to be recycled is stored in the text recycling window.

Optionally, the processor 2410 is further configured to detect a touch operation of the user on a first text content displayed in the text editing region; if a preset second touch operation is detected, determine at least one character selected by the second touch operation as a target text block to be recycled; and cache the target text block to the preset text recycling window.

Optionally, the processor 2410 caching the target text block to the preset text recycling window includes: judging whether a text block needs to be created; if a text block needs to be created, creating a target text block based on at least one character selected by the second touch operation, and caching the target text block to the preset text recycling window; if a text block does not need to be created, caching the target text block to a text block in the preset text recycling window which has a smallest time interval between a creation time thereof and a current time.

Optionally, the processor 2410 judging whether a text block needs to be created includes: detecting whether the second touch operation satisfies a first preset condition; and if it is detected that the second touch operation satisfies the first preset condition, determining that a text block needs to be created; the first preset condition includes at least one of following: a touch operation previous to the second touch operation is a preset operation; a time interval between the touch operation previous to the second touch operation and the second touch operation is larger than a first preset duration; wherein, the previous touch operation is a touch operation which has a smallest time interval between an operation time thereof and an operation time of the second touch operation; the preset operation includes at least one of: an operating region unfolding operation, a text recycling window starting operation, and a text adding operation.

Optionally, the processor 2410 is further configured to number the target text block according to a creation time of the target text block.

Optionally, the processor 2410 is further configured to display the text recycling window. Optionally, the processor 2410 displaying the text recycling window includes: detecting whether an input method function is invoked; if it is detected that the input method function is invoked, displaying a virtual keyboard; and displaying the text recycling window in a first preset region of the virtual keyboard.

Optionally, the processor 2410 displaying the text recycling window includes: if a text recycling function starting instruction input by the user is received, displaying the text recycling window in a second preset region of the current display interface.

Optionally, the processor 2410 is further configured to, if it is detected that an input method function is closed or a text recycling function disabling instruction input by the user is received, eliminate display of the text recycling window.

Optionally, the processor 2410 is further configured to detect the touch operation of the user on the text recycling window; if a preset third touch operation is detected, unfold the operating region of the text recycling window; and display at least one text block in the operating region in numerical sequence.

Optionally, the processor 2410 displaying at least one text block in the operating region in numerical sequence includes: determining at least one text block satisfying a second preset condition; and displaying the at least one text block in the operating region in numerical sequence.

Optionally, the at least one text block satisfying the second preset condition includes at least one of: at least one text block having a time interval between a creation time thereof and a current time smaller than a second preset duration; and at least one text block having a word number larger than a preset threshold.

Optionally, the processor 2410 displaying at least one text block includes: displaying at least one text block in a formatted display manner.

Optionally, the processor 2410 displaying at least one text block in a formatted display manner includes:

displaying at least one text block in a grid alignment manner; wherein each character in each text block corresponds to a grid.

Optionally, the processor 2410 is further configured to, if the preset first touch operation is detected, highlight the grid corresponding to each character selected by the first touch operation for a third preset duration.

Optionally, the processor 2410 is further configured to, if an operating region retraction instruction input by the user is received, retract the operating region of the text recycling window.

Optionally, the processor 2410 is further configured to acquire at least one character inputted by the user; adding the at least one character inputted by the user into the text editing region; and moving the cursor to the right of a last added character, the processor 2410 pasting at least one character selected by the first touch operation to the current position of the cursor in a text editing region includes:

pasting at least one character selected by the first touch operation to the current position of the cursor in the text editing region to generate a second text content, wherein the at least one character inputted by the user in the text editing region is displayed in a preset highlighted display manner, and/or, the at least one character selected by the first touch operation in the text editing region is displayed in a preset highlighted display manner.

Optionally, the touch operation includes: a sliding operation and a clicking operation; wherein the clicking operation comprises a single-clicking operation, a double-clicking operation, and a multi-clicking operation.

The mobile terminal 2400 can implement the processes implemented by the mobile terminals in the foregoing embodiments. To avoid repetition, details are not described herein again.

The mobile terminal 2400 in the embodiment of the present disclosure can quickly select a corresponding character from the text block and paste it to the current position of the cursor, and the user does not need to enter characters one by one, which can solve the problem of tedious operations of character deletion, insertion and modification in the character editing process, thereby enabling the user to complete the text editing quickly.

It will be appreciated that, in the embodiments of the present disclosure, the radio frequency unit 2401 may be used to receive and sent information, or receive and send signals during a call. Specifically, after the downlink data from the base station is received, it is processed by the processor 2410; in addition, the uplink data is sent to the base station. Generally, the radio frequency unit 2401 includes but is not limited to an antenna, at least one amplifier, a transceiver, a coupler, a low noise amplifier, a duplexer, and the like. In addition, the radio frequency unit 2401 can also communicate with the network and other devices through a wireless communication system.

The mobile terminal provides users with wireless broadband Internet access through the network module 2402, such as receiving and sending emails for users, browsing web pages, accessing streaming media, and the like.

The audio output unit 2403 may convert audio data received by the radio frequency unit 2401 or the network module 2402 or stored in the storage 2409 into audio signals and output as sound. Moreover, the audio output unit 2403 may also provide audio output (e.g., call signal reception sound, message reception sound, etc.) related to a specific function performed by the mobile terminal 2400. The audio output unit 2403 includes a speaker, a buzzer, a telephone receiver, and the like.

The input unit 2404 is used to receive audio or video signals. The input unit 2404 may include a graphics processing unit (GPU) 24041 and a microphone 24042, and the graphics processor 24041 may process image data of static pictures or videos obtained by an image capture device (such as a camera) in a video capture mode or an image capture mode. The processed image frames may be displayed on the display unit 2406. The image frames processed by the graphics processor 24041 may be stored in the storage 2409 (or other storage medium) or sent via the radio frequency unit 2401 or the network module 2402. The microphone 24042 can receive sound, and can process such sound into audio data. The processed audio data can be converted into a format that can be sent to the mobile communication base station via the radio frequency unit 2401 in the case of the telephone call mode, and sent.

The mobile terminal 2400 also includes at least one sensor 2405, such as a light sensor, a motion sensor, and other sensors. Specifically, the light sensor includes an ambient light sensor and a proximity sensor, where the ambient light sensor can adjust the brightness of the display panel 24061 according to the brightness of the ambient light, and the proximity sensor can turn off the display panel 24061 and/or backlight when the mobile terminal 2400 moves to the ear. As a type of motion sensor, an accelerometer sensor can detect the magnitude of acceleration in various directions (generally three axes), and can detect the magnitude and direction of gravity when at rest, and can be used for identifying of the posture of mobile terminal (such as horizontal and vertical screen switching, related games, magnetometer attitude calibration), vibration recognition related functions (such as pedometer, tap), etc; the sensor 2405 may also include a fingerprint sensor, a pressure sensor, an iris sensor, a molecular sensor, a gyroscope, a barometer, a hygrometer, a thermometer, an infrared sensor, etc., which will not be repeated here.

The display unit 2406 is used to display information input by the user or information provided to the user. The display unit 2406 may include a display panel 24061, and the display panel 24061 may be configured in the form of liquid crystal display (LCD), organic light-emitting diode (OLED), or the like.

The user input unit 2407 can be used to receive input numeric or character information, and generate key signal input related to user settings and function control of the mobile terminal. Specifically, the user input unit 2407 includes a touch panel 24071 and other input device(s) 24072. The touch panel 24071, also known as a touch screen, can collect user's touch operations on or near it (for example, operations by the user using any suitable object or accessory such as a finger or a stylus on or near the touch panel 2407). The touch panel 24071 may include two parts of a touch detection device and a touch controller. Among them, the touch detection device detects the user's touch orientation and detects the signal brought by the touch operation, and transmits the signal to the touch controller; the touch controller receives touch information from the touch detection device, converts it into contact coordinates, and then send it to the processor 2410, and receive the command sent by the processor 2410 and execute it. In addition, the touch panel 24071 can be implemented in various types, such as resistive, capacitive, infrared, and surface acoustic wave types. In addition to the touch panel 24071, the user input unit 2407 may also include other input device(s) 24072. Specifically, other input devices 24072 may include, but are not limited to, a physical keyboard, function keys (such as volume control keys, switch keys, etc.), a trackball, a mouse, and a joystick, which will not be repeated here.

Further, the touch panel 24071 may be overlaid on the display panel 24061. When the touch panel 24071 detects a touch operation on or near it, it transmit it to the processor 2410 to determine the type of touch event, and then the processor 2410 provides a corresponding visual output on the display panel 24061 according to the type of touch event. Although in FIG. 24, the touch panel 24071 and the display panel 24061 are implemented as two separate components to realize the input and output functions of the mobile terminal, in some embodiments, the touch panel 24071 and the display panel 24061 may be integrated together to implement the input and output functions of the mobile terminal, which is not specifically limited here.

The interface unit 2408 is an interface for connecting an external device to the mobile terminal 2400. For example, the external device may include a wired or wireless headset port, an external power (or battery charger) port, a wired or wireless data port, a memory card port, a port for connecting a device with an identification module, an audio input/output (I/O) port, a video I/O port, a headphone port, etc. The interface unit 2408 may be used to receive inputs from external devices (e.g., data information, power, etc.) and transmit the received inputs to one or more elements within the mobile terminal 2400 or may be used to transfer data between the mobile terminal 2400 and the external devices.

The storage 2409 may be used to store software programs and various data. The storage 2409 may mainly include a program storage area and a data storage area, where the program storage area may store an operating system, application programs required for at least one function (such as a sound playback function, an image playback function, etc.); the data storage area may store data created by the use of mobile phone (such as audio data, phone books, etc.), etc. In addition, the storage 2409 may include a high-speed random access memory, and may also include a non-volatile memory, such as at least one magnetic disk storage device, a flash memory device, or other volatile solid-state storage devices.

The processor 2410 is the control center of the mobile terminal, and uses various interfaces and lines to connect various parts of the entire mobile terminal. By running or performing software programs and/or modules stored in the storage 2409, and calling data stored in the storage 2409, it performs various functions and processing data of the mobile terminal, so as to monitor the entire mobile terminal. The processor 2410 may include one or more processing units; optionally, the processor 2410 may integrate an application processor and a modem processor, where the application processor mainly handles an operating system, a user interface, and application programs, etc., and the modem processor mainly handles wireless communication. It can be understood that, the foregoing modem processor may not be integrated into the processor 2410.

The mobile terminal 2400 may further include a power supply 2411 (such as a battery) that supplies power to the components. Optionally, the power supply 2411 may be logically connected to the processor 2410 through a power management system, thereby functions such as management of charging, discharging, and power consumption can be achieved through the power management system.

In addition, the mobile terminal 2400 includes some function modules not shown, which will not be detailed here.

Optionally, an embodiment of the present disclosure further provides a mobile terminal including the processor 2410, the storage 2409, a computer program stored on the storage 2409 and capable of running on the processor 2410. When the computer program is running on the processor 2410, the various processes of the above text editing method embodiments is implemented, and the same technical effects can be achieved, which will not be repeated here to avoid repetition.

The embodiments of the present disclosure also provide a computer readable storage medium that stores a computer program thereon. When the computer program is executed by a processor, the processes of the above text editing method embodiments are implemented, and the same technical effects can be achieved, which will not be repeated here to avoid repetition. The computer readable storage medium may be, for example, a read-only memory (ROM), a random access memory (RAM), a magnetic disk, or an optical disk, etc.

It should be noted that, the terms herein "comprising", "including" or any other variant thereof are intended to cover non-exclusive inclusion, so that a process, method, article or device that includes a series of elements includes not only those elements, but also other elements that are not explicitly listed, or include elements inherent to this process, method, article, or device. Without more restrictions, the element defined by the sentence "comprising a . . . " does not exclude that there are other identical elements in the process, method, article or device that includes the element.

Through the description of the above embodiments, those skilled in the art can clearly understand that the methods in the above embodiments can be implemented by means of software and a necessary general hardware platform, and of course, can also be implemented by hardware, but in many cases the former is a better implementation. Based on such an understanding, the essence of the technical solutions of the present disclosure, or in other words, the part of the present disclosure that contribute to related technologies, can be embodied in the form of a software product, and the computer software product is stored in a storage medium (such as a ROM/RAM, a magnetic disk, an optical disk), includes several instructions to enable a terminal (which may be a mobile phone, computer, server, air conditioner, or network device, etc.) to perform the methods described in various embodiments of the present disclosure.

The embodiments of the present disclosure have been described above with reference to the drawings, but the present disclosure is not limited to the above specific implementations. The above specific implementations are only schematic, not limitative. Under the enlightenment of the present disclosure, those of ordinary skill in the art can make many forms without departing from the purpose of the present disclosure and the scope protected by the claims, all of which fall within the protective scope of the present disclosure.

What is claimed is:

1. A text editing method, comprising:
   detecting a touch operation of a user on at least one text block displayed in an operating region of a preset text recycling window; and
   if a preset first touch operation is detected, pasting at least one character selected by the first touch operation to a current position of a cursor in a text editing region;
   wherein at least one recyclable text block is stored in the text recycling window, each recyclable text block is a text block deleted by the user through a cut operation and/or a delete operation;
   wherein prior to the detecting a touch operation of a user on at least one text block displayed in an operating region of a preset text recycling window, the method further comprises:
   detecting a touch operation of the user on a first text content displayed in the text editing region;
   if a preset second touch operation is detected, determining at least one character selected by the second touch operation as a target recyclable text block; and
   caching the target text block to the preset text recycling window; and
   wherein prior to the detecting a touch operation of a user on at least one text block displayed in an operating region of a preset text recycling window, the method further comprises:
   displaying the text recycling window.

2. The method according to claim 1, wherein the caching the target text block to the preset text recycling window comprises:
   judging whether a text block needs to be created;
   if a text block needs to be created, creating a target text block based on at least one character selected by the second touch operation, and caching the target text block to the preset text recycling window;
   if a text block does not need to be created, caching the target text block to a text block in the preset text recycling window which has a smallest time interval between a creation time thereof and a current time.

3. The method according to claim 2, wherein the judging whether a text block needs to be created comprises:
   detecting whether the second touch operation satisfies a first preset condition; and
   if it is detected that the second touch operation satisfies the first preset condition, determining that a text block needs to be created,
   the first preset condition comprises at least one of:
   a touch operation previous to the second touch operation is a preset operation;
   a time interval between the touch operation previous to the second touch operation and the second touch operation is larger than a first preset duration;
   wherein, the previous touch operation is a touch operation which has a smallest time interval between an operation time thereof and an operation time of the second touch operation; the preset operation comprises at least one of: an operating region unfolding operation, a text recycling window starting operation, and a text adding operation.

4. The method according to claim 1, further comprising:
after the caching the target text block to the preset text recycling window,
   numbering the target text block according to a creation time of the target text block.

5. The method according to claim 1, wherein the displaying the text recycling window comprises:
   detecting whether an input method function is invoked;
   if it is detected that the input method function is invoked, displaying a virtual keyboard; and
   displaying the text recycling window in a first preset region of the virtual keyboard.

6. The method according to claim 1, wherein the displaying the text recycling window comprises:
   if a text recycling function starting instruction input by the user is received, displaying the text recycling window in a second preset region of the current display interface.

7. The method according to claim 1, further comprising:
after the displaying the text recycling window,
   if it is detected that an input method function is closed or a text recycling function disabling instruction input by the user is received, eliminating display of the text recycling window.

8. The method according to claim 1, wherein after the displaying the text recycling window, and prior to the detecting a touch operation of a user on at least one text block displayed in an operating region of a preset text recycling window, the method further comprises:
   detecting the touch operation of the user on the text recycling window;
   if a preset third touch operation is detected, unfolding the operating region of the text recycling window; and
   displaying at least one text block in the operating region in numerical sequence.

9. The method according to claim 8, wherein the displaying at least one text block in the operating region in numerical sequence comprises:
   determining at least one text block satisfying a second preset condition; and displaying the at least one text block in the operating region in numerical sequence.

10. The method according to claim 9, wherein the at least one text block satisfying the second preset condition comprises at least one of:
   at least one text block having a time interval between a creation time thereof and a current time smaller than a second preset duration; and
   at least one text block having a word number larger than a preset threshold.

11. The method according to claim 8, wherein the displaying at least one text block comprises:
   displaying at least one text block in a formatted display manner.

12. The method according to claim 11, wherein the displaying at least one text block in a formatted display manner comprises:
   displaying at least one text block in a grid alignment manner;
   wherein each character in each text block corresponds to a grid.

13. The method according to claim 12, further comprising: after the detecting a touch operation of a user on at least one text block displayed in an operating region of a preset text recycling window,
   if the preset first touch operation is detected, highlighting the grid corresponding to each character selected by the first touch operation for a third preset duration.

14. The method according to claim 8, further comprising: after the unfolding the operating region of the text recycling window,
   if an operating region retraction instruction input by the user is received, retracting the operating region of the text recycling window.

15. The method according to claim 2, wherein after the caching the target text block to the preset text recycling window, the method further comprises:
   acquiring at least one character inputted by the user;
   adding the at least one character inputted by the user into the text editing region; and
   moving the cursor to the right of a last added character,
   the pasting at least one character selected by the first touch operation to the current position of the cursor in a text editing region comprises:
   pasting at least one character selected by the first touch operation to the current position of the cursor in the text editing region to generate a second text content,
   wherein the at least one character inputted by the user in the text editing region is displayed in a preset highlighted display manner, and/or, the at least one character selected by the first touch operation in the text editing region is displayed in a preset highlighted display manner.

16. The method according to claim 2, wherein the touch operation comprises: a sliding operation and a clicking operation; wherein the clicking operation comprises a single-clicking operation, a double-clicking operation, and a multi-clicking operation.

17. A mobile terminal, comprising a processor, a storage, and a computer program stored on the storage, wherein the computer program is executed by the processor to perform steps of a text editing method, the method comprising:
   detecting a touch operation of a user on at least one text block displayed in an operating region of a preset text recycling window; and
   if a preset first touch operation is detected, pasting at least one character selected by the first touch operation to a current position of a cursor in a text editing region;
   wherein at least one recyclable text block is stored in the text recycling window, each recyclable text block is a text block deleted by the user through a cut operation and/or a delete operation;
   wherein prior to the detecting a touch operation of a user on at least one text block displayed in an operating region of a preset text recycling window, the method further comprises:
   detecting a touch operation of the user on a first text content displayed in the text editing region;
   if a preset second touch operation is detected, determining at least one character selected by the second touch operation as a target recyclable text block; and
   caching the target text block to the preset text recycling window; and
   wherein prior to the detecting a touch operation of a user on at least one text block displayed in an operating region of a preset text recycling window, the method further comprises:
   displaying the text recycling window.

18. The mobile terminal according to claim 17, wherein the caching the target text block to the preset text recycling window comprises:
   judging whether a text block needs to be created;
   if a text block needs to be created, creating a target text block based on at least one character selected by the second touch operation, and caching the target text block to the preset text recycling window;
   if a text block does not need to be created, caching the target text block to a text block in the preset text recycling window which has a smallest time interval between a creation time thereof and a current time.

* * * * *